US010666657B1

(12) United States Patent
Threlkeld

(10) Patent No.: US 10,666,657 B1
(45) Date of Patent: *May 26, 2020

(54) TOKEN-BASED ACCESS CONTROL AND GROUPING

(71) Applicant: Amazon Technologies, Inc., Seattle, WA (US)

(72) Inventor: Richard Threlkeld, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 31 days.

This patent is subject to a terminal disclaimer.

(21) Appl. No.: 15/372,281

(22) Filed: Dec. 7, 2016

(51) Int. Cl.
*H04L 29/06* (2006.01)
*H04L 9/06* (2006.01)
*H04L 9/32* (2006.01)

(52) U.S. Cl.
CPC .......... *H04L 63/101* (2013.01); *H04L 9/0643* (2013.01); *H04L 9/3236* (2013.01); *H04L 63/06* (2013.01); *H04L 63/083* (2013.01); *H04L 63/20* (2013.01)

(58) Field of Classification Search
CPC ..... H04L 63/105; H04L 63/083; H04L 63/06; H04L 63/08; H04L 63/20; H04L 63/107; H04L 9/3242; H04L 9/14
USPC .................................................. 713/168–170
See application file for complete search history.

(56) References Cited

U.S. PATENT DOCUMENTS

| | | | | |
|---|---|---|---|---|
| 5,649,099 | A  * | 7/1997 | Theimer | G06F 9/468 709/229 |
| 6,882,620 | B1 * | 4/2005 | MacLellan | H04L 41/06 370/217 |
| 7,103,784 | B1 | 9/2006 | Brown et al. | |
| 7,650,647 | B1 * | 1/2010 | Hansmann | G06F 21/34 726/34 |
| 2005/0144452 | A1 * | 6/2005 | Lynch | G06F 21/33 713/170 |
| 2006/0236384 | A1 * | 10/2006 | Lindholm | H04L 63/083 726/10 |
| 2006/0259950 | A1 | 11/2006 | Mattsson | |
| 2012/0096272 | A1 | 4/2012 | Jasper et al. | |
| 2013/0346751 | A1 * | 12/2013 | Hannel | H04L 63/105 713/168 |
| 2015/0180872 | A1 * | 6/2015 | Christner | H04L 63/10 726/4 |

(Continued)

OTHER PUBLICATIONS

Atkinson, R., "IP Authentication Header," Request for Comments: 1826, Standards Track, Aug. 1995, 14 pages.

(Continued)

*Primary Examiner* — Jahangir Kabir
(74) *Attorney, Agent, or Firm* — Davis Wright Tremaine LLP

(57) ABSTRACT

One or more clients of a service may obtain access to resources of the service using one or more roles. A role may be used to delegate access to resources that a client normally would not otherwise have access to. A requestor may make a request to assume an intermediary role and receive a first token that enables assumption of the intermediary role. The requestor, after assuming the intermediary role, may request to assume to assume a destination role and receive a second token that enables the requestor to access one or more computing resources by assuming the destination role.

20 Claims, 17 Drawing Sheets

(56) References Cited

U.S. PATENT DOCUMENTS

2016/0224810 A1* 8/2016 Shahidzadeh ......... H04L 9/3242
2017/0093700 A1 3/2017 Gilley et al.

OTHER PUBLICATIONS

Atkinson, R., "IP Encapsulating Security Payload (ESP)," Request for Comments: 1827, Standards Track, Aug. 1995, 13 pages.
Atkinson, R., "Security Architecture for the Internet Protocol," Request for Comments: 1825, Standards Track, Aug. 1995, 23 pages.
Blake-Wilson et al., "Elliptic Curve Cryptography (ECC) Cipher Suites for Transport Layer Security (TLS)," Request for Comments: 4492, Informational, May 2006, 35 pages.
Blake-Wilson et al., "Transport Layer Security (TLS) Extensions," Request for Comments: 3546, Standards Track, Jun. 2003, 29 pages.
Blake-Wilson et al., "Transport Layer Security (TLS) Extensions," Request for Comments: 4366, Standards Track, Apr. 2006, 30 pages.
Blumenthal et al., "Pre-Shared Key (PSK) Ciphersuites with NULL Encryption for Transport Layer Security (TLS)," Request for Comments: 4785, Standards Track, Jan. 2007, 5 pages.
Brown et al., "Transport Layer Security (TLS) Authorization Extensions," Request for Comments: 5878, Experimental, May 2010, 19 pages.
Chown, "Advanced Encryption Standard (AES) Ciphersuites for Transport Layer Security (TLS)," Request for Comments: 3268, Standards Track, Jun. 2002, 7 pages.
Cohn et al., "MQTT Version 3.1.1," OASIS, ISO/IEC 20922, Oct. 29, 2014, 81 pages.
Dang, "Recommendation for Applications Using Approved Hash Algorithms," National Institute of Standards and Technology (NIST) Special Publication 800-107 Revision 1, Aug. 2010, retrieved Nov. 24, 2015, http://csrc.nist.gov/publications/nistpubs/800-107-rev1/sp800-107-rev1.pdf, 25 pages.
Dierks et al., "The TLS Protocol Version 1.0," Request for Comments 2246, Jan. 1999, 75 page.
Dierks et al., "The Transport Layer Security (TLS) Protocol Version 1.2," Request for Comments 5246, Standards Track, Aug. 2008, 98 pages.
Eastlake, E., "Transport Layer Security (TLS) Extensions: Extension Definitions," Request for Comments: 6066, Standards Track, Jan. 2011, 25 pages.
Eronen et al., "Pre-Shared Key Ciphersuites for Transport Layer Security (TLS)," Request for Comments 4279, Dec. 2005, 16 pages.
Ford-Hutchinson, "Securing FTP with TLS," Request for Comments: 4217, Standards Track, Oct. 2005, 29 pages.
Friend, "Transport Layer Security (TLS) Protocol Compression Using Lempel-Ziv-Stac (LZS)," Request for Comments: 3943, Informational, Nov. 2004, 13 pages.
Gutmann, "Encrypt-then-MAC for Transport Layer Security (TLS) and Datagram Transport Layer Security (DTLS)," Request for Comments: 7366, Standards Track, Sep. 2014, 7 pages.
Hoffman, "SMTP Service Extension for Secure SMTP over Transport Layer Security," Request for Comments: 3207, Standards Track, Feb. 2002, 9 pages.
Hollenbeck, "Transport Layer Security Protocol Compression Methods," Request for Comments: 3749, Standards Track, May 2004, 8 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Kanno et al., "Addition of the Camellia Cipher Suites to Transport Layer Security (TLS)," Request for Comments: 6367, Informational, Sep. 2011, 8 pages.
Karn, P., et al., "The ESP DES-CBC Transform," Request for Comments: 1829, Standards Track, Aug. 1995, 11 pages.
Kato et al., "Camellia Cipher Suites for TLS," Request for Comments: 5932, Standards Track, Jun. 2010, 6 pages.
Kent, S., "IP Encapsulating Security Payload (ESP)," Request for Comments: 4303, Standards Track, Dec. 2005, 45 pages.
Kent, S., "Security Architecture for the Internet Protocol," Request for Comments: 2401, Standards Track, Nov. 1998, 62 pages.
Kent, S., and K. Seo, "Security Architecture for the Internet Protocol," Request for Comments: 4301, Standards Track, Dec. 2005, 102 pages.
Khare et al., "Upgrading to TLS within HTTP/1.1," Request for Comments: 2817, Standards Track, May 2000, 13 pages.
Kim et al., "Addition of the ARIA Cipher Suites to Transport Layer Security (TLS)," Request for Comments: 6209, Informational, Apr. 2011, 9 pages.
Lee et al., "Addition of SEED Cipher Suites to Transport Layer Security (TLS)," Request for Comments: 4162, Standards Track, Aug. 2005, 6 pages.
Mavrogiannopoulos et al., "Using OpenPGP Keys for Transport Layer Security (TLS) Authentication," Request for Comments: 6091, Informational, Feb. 2011, 9 pages.
Mavrogiannopoulos, "Using OpenPGP Keys for Transport Layer Security (TLS) Authentication," Request for Comments: 5081, Experimental, Nov. 2007, 8 pages.
McGrew et al., "AES-CCM Cipher Suites for Transport Layer Security (TLS)," Request for Comments: 6655, Standards Track, Jul. 2012, 8 pages.
McGrew et al., "Datagram Transport Layer Security (DTLS) Extension to Establish Keys for the Secure Real-time Transport Protocol (SRTP)," Request for Comments 5764, May 2010, 27 pages.
Medvinsky et al., "Addition of Kerberos Cipher Suites to Transport Layer Security (TLS)," Request for Comments: 2712, Standards Track, Oct. 1999, 7 pages.
Merkle et al., "Elliptic Curve Cryptography (ECC) Brainpool Curves for Transport Layer Security (TLS)," Request for Comments: 7027, Informational, Oct. 2013, 10 pages.
Metzger, P., et al., "IP Authentication Using Keyed MD5," Request for Comments: 1828, Standards Track, Aug. 1995, 6 pages.
Moriai et al., "Addition of Camellia Cipher Suites to Transport Layer Security (TLS)," Request for Comments: 4132, Standards Track, Jul. 2005, 7 pages.
Newman, "Using TLS with IMAP, POP3 and ACAP," Request for Comments: 2595, Standards Track, Jun. 1999, 15 pages.
Orman, H., "The OAKLEY Key Determination Protocol," Request for Comments: 2412, Informational, Nov. 1998, 56 pages.
Phelan, "Datagram Transport Layer Security (DTLS) over the Datagram Congestion Control Protocol (DCCP)," Request for Comments 5238, May 2008, 11 pages.
Rescorla et al., "Datagram Transport Layer Security Version 1.2," Request for Comments 6347, Jan. 2012, 33 pages.
Rescorla et al., "Datagram Transport Layer Security," Request for Comments: 4347, Standards Track, Apr. 2006, 25 pages.
Rescorla et al., "Transport Layer Security (TLS) Renegotiation Indication Extension," Request for Comments: 5746, Standards Track, Feb. 2010, 15 pages.
Rescorla, "HTTP Over TLS," Request for Comments: 2818, Informational, May 2000, 7 pages.
Rescorla, "TLS Elliptic Curve Cipher Suites with SHA-256/384 and AES Galois Counter Mode (GCM)," Request for Comments: 5289, Informational, Aug. 2008, 6 pages.
Salowey et al., "Transport Layer Security (TLS) Session Resumption without Server-Side State," Request for Comments: 5077, Standards Track, Jan. 2008, 20 pages.
Salowey, "AES Galois Counter Mode (GCM) Cipher Suites for TLS," Request for Comments: 5288, Standards Track, Aug. 2008, 8 pages.
Salter et al., "Suite B Profile for Transport Layer Security (TLS)," Request for Comments: 6460, Informational, Jan. 2012, 14 pages.
Santesson et al., "TLS User Mapping Extension," Request for Comments: 4681, Standards Track, Oct. 2006, 11 pages.
Santesson, "TLS Handshake Message for Supplemental Data," Request for Comments: 4680, Standards Track, Sep. 2006, 9 pages.
Taylor et al., "Using the Secure Remote Password (SRP) Protocol for TLS Authentication," Request for Comments: 5054, Informational, Nov. 2007, 24 pages.

(56) References Cited

OTHER PUBLICATIONS

Tuexen et al., "Datagram Transport Layer Security (DTLS) for Stream Control Transmission Protocol (SCTP)," Request for Comments 6083, Jan. 2011, 10 pages.
Turner et al., "Prohibiting Secure Sockets Layer (SSL) Version 2.0," Request for Comments 6176, Mar. 2011, 4 pages.

* cited by examiner

TOKEN-BASED ACCESS CONTROL AND GROUPING

CROSS-REFERENCE TO RELATED APPLICATIONS

This application is related to and incorporates by reference for all purposes the full disclosure of co-pending U.S. patent application Ser. No. 15/372,302, filed concurrently herewith, entitled "TOKEN-BASED ACCESS TRACKING AND REVOCATION," and U.S. patent application Ser. No. 15/372,315, filed concurrently herewith, entitled "TOKEN-BASED CREDENTIAL RENEWAL SERVICE."

BACKGROUND

Maintaining the security of computer resources is a difficult problem, especially as the complexity of such systems increases. One way that computer systems may secure computing resources is to require an entity attempting to access a computing resource to provide credentials—such as a username and password—that may be used to authenticate the identity of the entity and determine whether that entity is authorized to access the resource requested. However, in large-scale computing environments, propagating credentials to multiple entities may be difficult, costly, and/or introduce additional vulnerabilities in a system that may be attacked by an adversary.

Alternatively, a computer system may distribute short-term credentials to authenticate the identity of an entity and determine whether that entity is authorized to access a requested resource. However, short-term credentials in at least some implementations have several shortcomings as compared to user-based credential systems. For example, user-based credential systems may support group behavior where a group of users has a shared set of rights to access certain resources, however, these systems typically authenticate the identity of an entity using a username and password that is setup and determined ahead of time.

BRIEF DESCRIPTION OF THE DRAWINGS

Various techniques will be described with reference to the drawings, in which.

DETAILED DESCRIPTION

Figure 1:
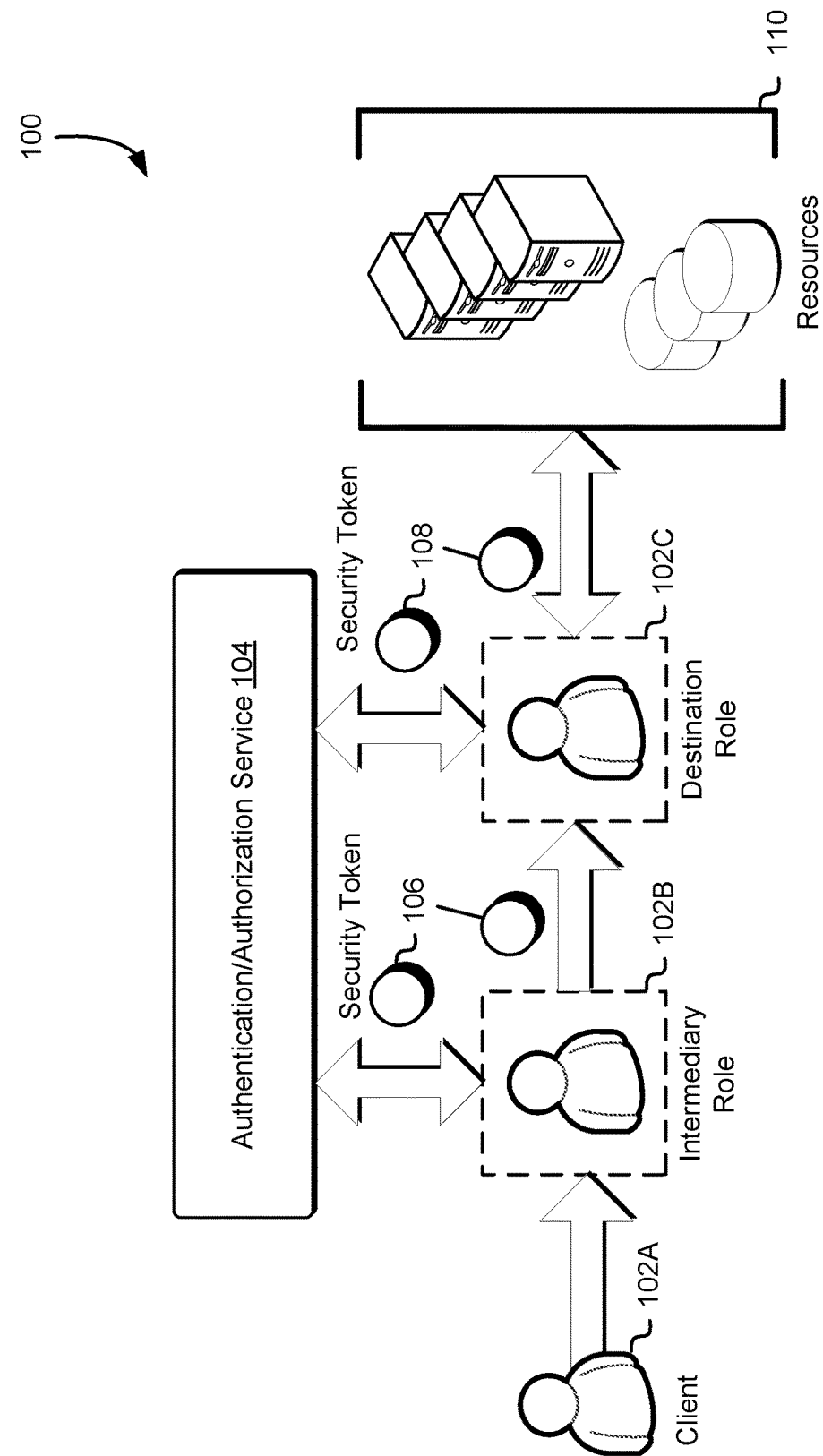
FIG. 1 shows an illustrative example of a client obtaining access to resources by using permissions associated with a destination role.

This document describes techniques for providing short term access controls and role-groups based on short-term security tokens that may be adapted to various computing environments.

A role may be an identity within a computing environment with permission policies that may be used to determine a set of capabilities that the role is capable of performing within the context of the computing environment. The permissions may include rights to access data resources (e.g., rights to create, read, update, and delete a file) as well as access to services (e.g., rights to make an API request and have the request fulfilled by a service) as well as other rights (e.g., administrative rights in a computer system to grant or revoke permissions to users). However, a role is not necessarily uniquely associated with an underlying user or identity and may be assumable by anyone that has a permission to assume the role. In some cases, access keys are dynamically created when a role is assumed.

In some computer systems, a role-group may be a role having permissions that a set of users are intended to share. Role-group based functionality may be a set of one or more permissions that may be used by a group of identities. For example, a role-group for "ENGINEERING" may include permissions to access source code, and any employee that is an engineer may have access to the source code by assuming the "ENGINEERING" role-group. A computer system may use a two-step role assumption process to provide short term access controls and role-group based functionality. As a first step, a principal (e.g., a user account or role) may assume a first, intermediary role that includes a set of known rights and permissions. In some cases, the intermediary role may be a default role that includes no permissions other than permission to assume a second destination role. After assuming the first, intermediary role, the principal may assume a second, destination role and provide its identity. A token service may verify that the principal attempting to assume the second destination role is presently in the first, intermediary role and then provide a security token for assuming the destination role. Conversely, when a requestor has not assumed the intermediary role and attempts to assume the destination role, the token service may deny the request and/or provide an indication to the requestor that assumption of the intermediary role is required to successfully assume the destination role.

When a principal assumes the destination role, it may receive a resource identifier and a hashed message such as a keyed-hash message authentication code (HMAC). The resource identifier may be a resource identifier associated with the destination role and may be in a human readable format. The HMAC may also be associated with the destination role but typically will not be human readable. The HMAC may include security information that may be used to grant permissions to resources that the destination resource may access, and may further include an expiration time that indicates when the HMAC expires. For example, the HMAC for a role-group may be set to expire every 15 minutes.

A database may be used to store the role-groups and associated HMACs. For example, a database may have database row entries for each user and role-group pair and also an HMAC code associated to the role-group. The database may have a many-to-many relationship between users and role-groups—that is, one user may be associated with multiple (i.e., more than one) role-group, and one role-group may be associated with multiple (i.e., more than one) users. Other types of storage formats may also be used to store the grouping information, such as a data file, spreadsheet, multiple database tables, or various other types of indexed data formats.

An application programming interface (API) call may be used to assume a role. When a principal assumes a role, it may have permissions associated with the role. For example, a role may have access to a certain database, computing resources (such as a virtual machine), or cryptographic keys. A principal such as a user may assume the role and then request access to the resource by providing the resource name and HMAC associated with the role. A computer system may receive the request and use an authorization module to determine whether the requestor (in this case, the role) should be granted access to the resource. The requestor may check whether an access control list associated includes the role as being sufficiently privileged to access the resource. An access control list may be implemented using various types of data structures such as an array, a vector, a map, a hash, etc. and/or structured storage such as a database table or any combination thereof. Additionally, the authentication module may verify the HMAC. The HMAC may be verified by generating a new HMAC using the key and checking if it matches the HMAC provided in the request. Additionally, once the HMAC has been verified to be authentic, the expiration time for the HMAC may be compared against the system clock. If the expiration time of the HMAC code is earlier than the service's current system time, it may indicate that the HMAC code has expired and that the requestor does not have access to the requested resource.

There are several aspects to the use of HMAC codes in accordance with various implementations. First, in some examples, the HMAC code includes an expiration time—when the HMAC expires, the principal assuming the destination role no longer has the rights associated with the destination role and until the principal obtains a new HMAC code that is no longer expired. When an HMAC code expires, a backend system may automatically detect that the HMAC code has expired, and generate a new HMAC code that is set to expire 15 minutes after it was generated. Second, a credential renewal service may be used to publish the new HMAC code to entities that have assumed the destination role and need the new HMAC code to perform operations under the assumed destination role. The credential renewal service may allow principals that assume a role to subscribe to a notification broadcast system that allows the subscribers to receive new HMAC codes as they are made available. Note that there are cases where a new HMAC code may be made available at a time other than the expiration period, such as when credentials are prematurely revoked. Third, a credential revocation service may be used to cause credentials to be revoked from some (or even all) users of a role-group. Examples of when credentials may be revoked include where the computer system determines that a user account may be compromised (e.g., based on a number of failed logins attempted or detecting an attempted login from an unexpected geographical location). However, there are also cases where credentials are expected to be revoked prior to the expiration time, such as where a user is moved by a system administration from one role-group (having a first HMAC code associated with it) to another role-group (having a second, different, HMAC code associated with it). Furthermore, as will be described in greater detail herein, the revocation of credentials may be scoped to various levels—for example, credential revocation may be scoped to a particular user, but may also be scoped to a particular device.

When credentials for a role-group are re-generated, they may be provided to an event-driven platform that automatically updates a database table that stores the logical grouping information. A worker routine may access the database, find some or all users associated with the role-group, remove the HMAC entry in the database and replace it with the newly generated HMAC code. Furthermore, a credential renewal service system may be used to provide the user with the new HMAC and/or provide an indication the user that the HMAC code that the user has previously been using is expired and that a new one may be available to the user, for example, through a secure token service.

When credentials are revoked, the validity of the HMAC associated with the credential is no longer valid, even if the code has not yet expired. When credentials for an entire group are revoked, the system may generate a new HMAC code and all instances of the revoked HMAC code in the database containing the logical groupings may be replaced by the new HMAC code. In this way, users that had access to the old HMAC code may access the new HMAC code. This type of revocation may be used in various scenarios, such as when it has been detected that an HMAC has been obtained by a malicious party.

Another example of a revocation relates to revocation of credentials from a user in a group. In this example, a role-group may have multiple users, and a particular user of the role-group may have been removed for various reasons. When a user is removed from a role-group, the system may detect the user was removed and generate a new HMAC code. The system may access the database and find all users in the role-group. The system may then replace the old, revoked HMAC with the new HMAC code for all users in the group except for the user being removed. The user being removed from the group may have its database entry associating the user to the role-group deleted or marked as revoked. Thus, other users in the group may assume that role by obtaining the new HMAC from the database, but the user that was removed from the group will no longer be able to assume the role because it does not have access to the new HMAC (the database entry for the user associated with the role-group was not updated with the new HMAC) and the old HMAC will not allow the user to assume the role because the authentication service will detect that the old HMAC is no longer associated with the role-group.

In some systems, permissions associated with a user and a role are not cumulative that is, one set of permissions active at a time, and switching from a user to a role (or from a first role to a second role) grants permissions based on the assumed role and not the permissions associated with the previous principal. As an example, a user that normally has access to computing resources {A, B, C} may assume a role that grants access to resources {C, D, E}. In this example, once the role has been assumed, access to resources {A, B} is temporarily relinquished. When the role is exited, the user permissions to {A, B, C} may be automatically restored.

An event-driven platform may determine when an event occurs and perform custom logic in response to the event being triggered. An event trigger may, for example, be the system's date/time exceeding the date/time of an expiration time. In some embodiments, distributed computing resources may provision and load custom logic/code in response to the event, run code, and then unload the code and de-provision the computing resource.

In response to detecting a timed event, the event-driven platform may provide an indication to the token management service that the security token associated with a role should be re-generated. The token management service may generate a new security token (e.g., HMAC). In some cases, security tokens are generated at least in part by using a one-way function and a cryptographic key. The new security token may be provided to a token repository that stores security tokens and contains one or more database tables that each correspond to a role and associated members of the role (i.e., principals that may assume the role). The new security token may be generated asynchronously of the indication that caused the token to be generated. As an example, in response to detecting an indication that the security token associated with a role should be re-generated, the event-driven platform may create a new thread or virtual machine instance that performs the routine associated with re-generating the security token. Further, a routine may be submitted to a queue for fulfillment at a later time, such as where there is a limited number of threads in a thread pool or limited number of virtual machine instances, metadata associated with the routine may be stored and used at a later time (e.g., when a thread of a thread pool becomes available) to execute the workflow for generating a new security token to replace the old security token. In some embodiments, the existing security token may be synchronously invalidated (e.g., as part of detecting the security token should be re-generated) and the new security token may be asynchronously generated.

After the security token is stored in the token repository, a client may request the token via an authentication service. The authentication service may verify that the client has assumed an intermediary role prior to requesting the token and verify via the appropriate table in the token repository that the requestor has permissions to assume the role.

A revocation condition that causes the system to revoke credentials may be satisfied based on various types of events. As an example, an event that may satisfy a revocation condition may include an attempted login by a user from a device that may indicate that the user account was compromised. As an example, a user may typically login from a computer device that is located in an organization's office, datacenter, etc. An abnormal login attempt may be detected from another device outside of the organization's offices. Various criteria may be used to determine when a login or login attempt is considered abnormal, including the device type (e.g., cell phone, laptop, desktop), geolocation, IP (internet protocol) address, login time (i.e., early morning, midday, late evening), and various other types of identification information. In some cases, an abnormal login may be detected by a system determining the location of the user (e.g., by using a MFA device) and determining the abnormal login originates from a geolocation different from the location of the user.

An event-driven platform may monitor events that occur within a system or service, such as login attempts. An event-driven platform may detect a condition that would require revocation of credentials, such as one or more unauthorized login attempts to the user and upon detecting certain events, invoke custom logic/code. For example, upon detecting that a user's account may have been compromised, the event-driven platform may determine that the user's access to a role should be revoked (and possibly restored later after verifying that the account has been secured). The event-driven platform may the potentially remove a compromised user from a database table that stores information regarding which principals are in the group. In some embodiments, the database may contain one or more HMACs that may be used as security tokens. The token management service may generate a new security token by rotating cryptographic keys. A key rotation may occur by using a one-way function and a new cryptographic key different from the cryptographic key used to generate the security token being revoked. Thus, when the potentially compromised user requests to obtain the security token from the authentication service, it will fail to obtain the security token because the database table including all principals that may assume the role does not include the user. Conversely, when another user requests to assume the role corresponding to the database table, the request will be successfully fulfilled because the other user will be found in the database table.

Furthermore, the potentially compromised user will not be able to use the revoked security token that it may have previously obtained somehow. For example, if the user attempts to use a revoked token to assume a role, the authentication service will receive the request. In some embodiments, an HMAC may be included in the token, and the token management service may be used in part to verify the HMAC by generating an HMAC using the new cryptographic key. The generated HMAC and the HMAC provided by the user will be different because different cryptographic keys were used in the one-way hash function for the generated HMAC and provided HMAC.

In an embodiment, when a client (such as the client 1310 shown in FIG. 13) logs into a system, its identity is authenticated by an authentication service and the client may receive a security token that expires after a predetermined period. The authentication service may provide a credential renewal service with information about the client that allows the credential renewal service to publish updates to the security token. Thus, when the security token expires, the client receives, from the credential renewal service, an updated security token. The client may replace the expired token with the updated token and continue to perform operations such as assumption of roles with the updated token.

Consider a second embodiment, where multiple clients have logged into a system and assumed a destination role. If it has been determined that an abnormal event has occurred (e.g., a login from an unexpected geolocation), the system may determine that a key rotation should occur, invalidating all outstanding instances of the security token associated to the role. The credential renewal service may, after a key rotation, publish the updated security token generated using the new key to one or more clients. Furthermore, the credential renewal service may exclude one or more clients in this case based on the abnormal event. For example, a particular user or a set of device sessions using the user account may be excluded from receiving the new security token when the credential renewal service publishes it to the group.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment in which various embodiments can be implemented. The computing environment 100 illustrates a client 102A that may assume various roles 102B and 102C. The assumption of an intermediary role 102B may be required to subsequently assume a destination role 102C which may be used to access a set of computing resources 110. An authentication/authorization service 104 may be used to assume different roles and role-groups. The client may make a request to the authentication/authorization service 104 to assume a role, and a security token may be provided to the client to allow the client to assume the role.

Clients such as the client 102A shown in FIG. 1 may be any entity operable to access services such as the authentication/authorization service 104 shown in FIG. 1. For example, a client may be a user account of a computer system such that the user account is uniquely associated to an entity (e.g., a human user). As a second example, a client may also be a computing instance such as a virtual machine instance being hosted on one or more computer servers. In some embodiments, the client may interact with the authentication/authorization service 104 and/or other services via any appropriate network, such as an intranet, the Internet, a cellular network, a local area network, a satellite network or any other such network and/or combination thereof.

A client 102A may be capable of assuming one or more roles. A role may be used to delegate access to users or services that normally would not otherwise have access to a set of resources. A role may be similar to a user account in some respects—for example, a user account and a role may both be identities within a computing environment with associated permission policies that determine what the identity can or cannot do within the context of the computing environment. However, a role may differ from a user account in that it is not uniquely associated with one person and may be assumed by anyone that needs it. For example, a first client corresponding to a first user account may assume a role and a second user client corresponding to a second user may also assume that same role. A role may be assumed by any party that needs the permissions and access rights associated with the role. Furthermore, in some embodiments, a role does not have credentials (passwords or access keys) associated with it. Instead, if a user is assigned to a role, access keys are created dynamically and provided to the user.

In many computer systems, only one set of permissions is active at a time. In other words, permissions are not cumulative such that when a principal (e.g., a user account or another role) assumes a role, the principal gives up its permissions and works with the permissions associated to the assumed role. A role may be used in a computing environment to implement various best practices. For example, consider a computing environment with a set of critical virtual machine instances. Instead of directly granting users permission to terminate the critical instances, a role with those privileges may be created and administrators may assume that role when they need to terminate an instance, thereby adding a layer of protection to the instances. Additionally, multi-factor authentication (MFA) protection may be used to protect the role such that only users who sign in with a MFA device can assume the role. Such a configuration may be used to enforce a principle of least access so that the use of elevated permissions is restricted only to those times where the elevated permissions are needed for performing a specific task.

A client 102A may assume a role by using an authentication/authorization service 104. An authentication/authorization service 104 may be a computer system, computer system process, program application, service module, or a combination of these and/or other such computing system entities. The authentication/authorization may be implemented by a combination of services, and may be separate services in a system that provide separate interfaces for authentication and authorization of client requests. For example, FIG. 2 describes below a system where an authentication service is used to authenticate the identity of a requestor and an authorization module in a separate service is used to authorize access to backend computing resources. The authentication/authorization service 104 may be configured to receive application programming interface (API) requests from the client and may further support APIs that enable a principal to assume a role. In some embodiments, an API that enables a requestor to assume a role may include one or more of the following input parameters: the duration of the role session; an external identifier that may be used to help third parties bind a role to an external client or customer who created it; a policy parameter that, if provided, causes the security credentials returned by the request to have the intersection of the access policy of the role being assumed and the provided policy parameter; a resource name identifier of the role to assume; an identifier for the assumed role session that uniquely identities a session when the same role is assumed by different principals or for different reasons; a serial number that identifies a MFA device that is associated with the user making the API request to assume a role—as discussed above, this may be used as an additional layer of security; a token code provided by the MFA device if the trust policy of the role being assumed requires MFA (i.e., that assumption of the role includes a condition that tests for MFA); and more. In some embodiments, one or more of the parameters are provided in JavaScript Object Notation (JSON) format.

In response to receiving a request from a client 102A to assume a role, the authentication/authorization service 104 may provide a security token 106 to the client. In some embodiments, the security token may include a resource name identifier corresponding to the assumed role and security credentials corresponding to the assumed role. The resource name identifier and assumed role identifiers may be used to refer to the resulting security credentials.

The security credentials may be temporary security credentials that are set to expire after a predetermined period of time. In some embodiments, the requestor may be able to specify the expiration time within a predetermined range. For example, the client 102A may specify an expiration time between a minimum value of 900 seconds (15 minutes) and a maximum value of 3600 (1 hour). The credentials may include: an access key identifier, a secret access key, and a security token. In some embodiments, the credentials and/or security token may include a keyed-hash message authentication code that includes information that is verifiable by the authentication/authorization service or token service having access to a cryptographic key that may be used to generate the MAC.

In some embodiments, the intermediary role 102B may be a default role that contains a predefined set of permissions. In some embodiments, the default role may contain no permissions, or may contain only the minimum set of permissions required to assume the destination role. However, the intermediary role may instead have a particular set of permissions associated with it. In some embodiments, the client 102A may provide its identity as part of a request to assume the intermediary role. Fulfillment or denial of the request by the authentication/authorization service 104 may be based in part on the identity of the principal requesting to assume the intermediary role 102B.

In some embodiments, after a client 102A assumes a first intermediary role 102B, it may then assume a second destination role 102C. Assumption of the destination role 102C may be predicated upon the client first having assumed the intermediary role 102B. For example, when a principal sends a request to the authentication/authorization service 104 to assume the destination role 102C, the principal may be required to provide the security token 106 of the intermediary role to successfully assume the destination role 102C.

In order to assume the destination role 102C, the principal requesting to assume the destination role may be required to have assumed the intermediary role 102B. Thus, in an example in accordance with FIG. 1, it may be the case that it is valid for the client 102A to assume the intermediary role 102B and then assume the destination role 102C, but not for the client 102A to directly assume the destination role 102C without having assumed the intermediary role 120B. In other words, a transitivity relationship may not exist between the roles. Assumption of the destination role 102C may be performed in the following manner: the client 102A, after assuming the intermediary role 102B (e.g., as described above) may request, with the authentication/authorization service 104, to assume the destination role. As part of the request, the requestor may be required to provide information that may be used to show that the requestor, at the time the request is made, is assuming the intermediary role 102B. This information may include, for example, providing, as part of the request, the resource name identifier corresponding to the intermediary role and/or the security token 106 associated with the intermediary role. Additionally, the identity of the principal may also be provided as part of the request such that the authentication/authorization service may be able to both determine the identity of the requestor (in FIG. 1, the client 102A) and that the requestor has assumed a particular role (in FIG. 1, the intermediary role 102B).

If assumption of the destination role 102C is successful, the authentication/authorization service 104 may provide a security token 108 associated with the destination role to the requestor. In some embodiments, the security token may include a resource name identifier corresponding to the assumed role and security credentials corresponding to the assumed role. In some embodiments an HMAC is also included in addition to or as part of the security credentials. In some embodiments, the expiration time is described in UTC time. In some embodiments, the expiration time may be described in accordance with prevailing time or calendaring standards such as the ISO 8601 format. In some embodiments, the expiration time may be included as part of the HMAC such that the authenticity of a message including the purported expiration time is verifiable to a system having access to the cryptographic key that was used to generate the HMAC. In some embodiments, the expiration time is included as part of the HMAC explicitly (e.g., a date/time is encoded in the message itself) or implicitly (e.g., a reference is provided such that the reference may be used to obtain the expiration time from another source, such as a Uniform Resource Locator (URL) address or Uniform Resource Identifier). In either case, there may be additional security assurances over the expiration time, such as encryption and/or a digital signature as to ensure confidentiality and/or authenticity of the expiration time.

In some embodiments, the client 102A may first assume an intermediary role 102B and then assume a role-group which may provide a set of permissions associated with a logical grouping. For example, a role-group "ENGINEERING" may include a set of permissions that may be used to access resources in a computing environment that employees of an organization may need access to (e.g., blueprints, source code, archives, technical documents) and a role-group for "MARKETING" may correspond to a set of resources that members of a marketing team in an organization may need to access. A role-group may be considered equivalent to the destination role 102C in some embodiments.

By assuming the destination role 102C, the client may obtain access permissions to one or more resources 110 by presenting the security token 108 associated with the destination role. In some embodiments, the resources 110 may be available to the destination role 102C indirectly via requests to a service where requests to the service contain the security token 108 of the destination role. Resources 110 may refer to various types of computing resources, including: load balancers, certificate managers, logs, computing instances, block level storage volumes, user accounts, groups of user accounts, roles, security policies, databases, storage services, distributing computing platforms, and the like—this list is merely illustrative and not limiting with regard to the types of resources that may be obtained, for example, from a distributed system.

Figure 2:
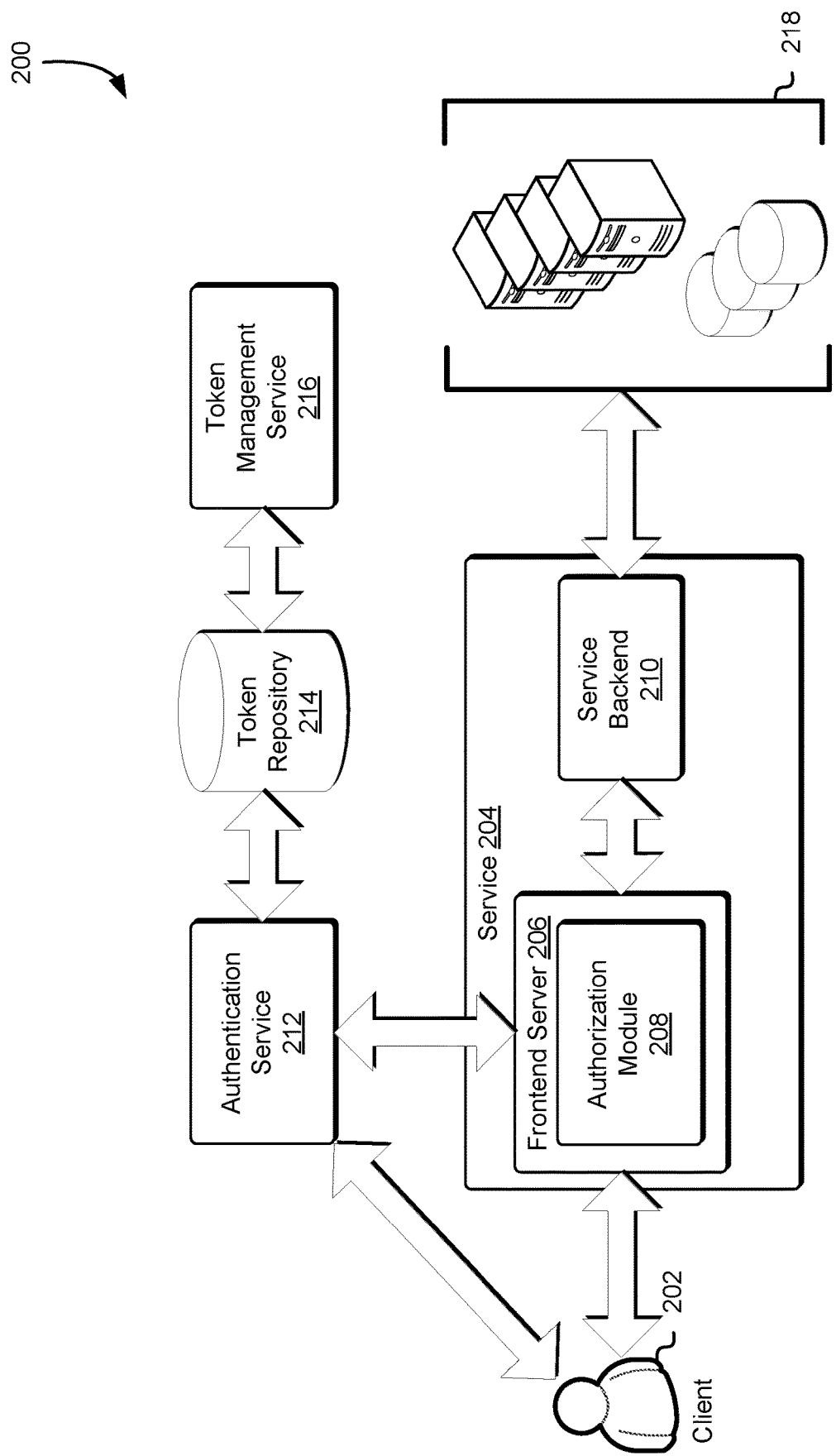
FIG. 2 shows an illustrative environment for how various components in accordance with several embodiments may be implemented.

FIG. 2 illustrates an environment in which various embodiments can be implemented. The computing environment 200 illustrates a client 202 and a set of computing services that the client may use in various embodiments such as those in accordance with FIG. 1. The environment 200 may further include a service 204, a frontend server 206, an authorization module 208, a service backend 210, an authentication service 212, a token repository 214, a token management service 216, and resources 218.

The client 202 may be the same or similar client with regard to those discussed above in connection with FIG. 1. Furthermore, it should be noted that the client 202 may be a user account having a set of credentials (e.g., a username and password) or may be an assumed role. The client may be configured to communicate (e.g., transmit requests and receive responses) from one or more services. In some embodiments, the client 202 may be configured to communicate with a service 204 that may be used to provide access to computer resources as well as an authentication service 212 that enables users to create and use unique identities and authenticate them. However, in some embodiments (not shown in FIG. 2) the client may communicate with a single service or endpoint that provides some or all of the services shown in FIG. 2—for example, a service provider (not shown in FIG. 2) may include both the components shown in the service 204 and authentication service 212 of FIG. 2.

The service 204 may be a service provider that can be used to obtain resources or obtain access to resources. In some embodiments, the service 204 includes a frontend server 206 and a service backend 210, but in other embodiments one or more of the components of the service shown in FIG. 2 may be performed by other components—i.e., the frontend server, service backend, and respective subcomponents therein do not necessarily need to be part of the service 204 but may be in a separate component accessible by the service 204.

The client 202 may communicate with the service 204 using API requests and may assume one or more roles as prior to providing an API request. API requests may be handled at least in part by a frontend server 206. The frontend server may be hardware, software, or a combination thereof. Regardless, the frontend server may further include an authorization module 208 or may communicate with an authorization service (not shown in FIG. 2) that may be a subservice of the frontend server or may be a separate component from the frontend server. The frontend server 206 may be configured to receive API requests from a requestor such as the client 202, determine whether to grant the request, and access a service backend 210 to fulfill the request.

The authorization module 208 may be used to determine whether and/or how to fulfill a request and in some embodiments may be a standalone service or a subservice of the frontend server 206 or service 204. An authorization module 208 may determine the permissions associated with a principal requesting access to one or more resources (e.g., resources 218 accessible by a service backend) by parsing a request, determining the permissions associated with the requestor, and determining how to handle the request. The authorization module 208 may use the authentication service 212 to authenticate that the identity of the requestor is who it purports to be. The authorization module may make a determination of whether the requestor should be granted access to one or more resources, for example, by checking security policies attached to the request resource, the requestor, the token, or some combination thereof. As a first example, the resource requested may have a corresponding access control list that describes which principals (e.g., user accounts, groups, roles) may access the resource. The access control list may also include a blacklist of principals that affirmatively may not access the resource and may supersede any other policies ostensibly granting the blacklisted principal access to the resource. As a second example, a security policy may be associated with the requestor or security token. The security policies may reside in a security policy repository (not shown in FIG. 2) that may, for example, be accessible via a database.

The frontend service 206 may be configured to communicate with a service backend 210 that may be used to access one or more resources 218 that may be requested by the client. The resources 218 may be computer or electronic-based resources such as those described above in connection with FIG. 1.

The authentication service 212 may be used to perform identity related tasks, such as assuming roles. An authentication service 212 may be a computer system, computer system process, program application, service module, or a combination of these and/or other such computing system entities. The authentication service 104 may be configured to receive API requests from the client and may further support APIs that enable a principal to assume a role. In some embodiments, a principal (e.g., a user account or role) may request to assume a role by specifying the requested role as part of an API request. In some cases, the requestor may be required to previously assume an intermediary role or a default role, which was discussed above in connection with FIG. 1. In some embodiments, a client may assume an intermediary role and then submit a request to assume a new role without explicitly specifying the new role. In such an example, the client, having assumed the intermediary role, may instead provide identity information that enables the authentication service 212 to determine the underlying user account. The authentication service may determine the underlying user account and then provide a role that the underlying user account is allowed to assume. In some embodiments, the authentication service provides, in response to a request to assume a role, a security token that includes a HMAC having an expiration time.

In some embodiments, the authentication service 212 may communicate with a token repository 214 that may be used to store security tokens or portions thereof. A token repository 214 may be implemented using one or more databases, or other types of structured storage. In one case, the token repository may have a database that may be structured as follows: a first role table such that each row of the table corresponds to a role. The role may further include a data column that includes the security token associated with the role. In some embodiments, the data column may include an HMAC. Each row of the role table may include a primary key identifier that uniquely identifies a row. A second associate table may store, in each row of the second table, a reference to a principal (e.g., a resource name identifier) and a reference to a column in the role table correspond to a role that the principal may assume. There may be multiple rows in the associate table for a given principal if the principal may assume multiple roles—e.g., one row for each role the principal may assume. In some embodiments, authentication service 212 may manage the token repository and determine which roles a principal may assume.

A token management service 216 may be used to perform operations related to the management of security tokens. The token management service may generate a security token (e.g., a HMAC) when a role is created. The token management service may further have access to a cryptographic key that may be used for generating HMACs. However, in other embodiments, the separate cryptography service may be used to generate HMACs. An HMAC may be generated using various one-way hash functions such as a secure hash algorithm (e.g., SHA-256 algorithm).

In some embodiments, one or more components may communicate using a cryptographically protected communication session. A cryptographically protected communication session may refer to a communication or set of communications wherein one or more assurances as to the attributes of the communication(s) may be made based on the use of cryptographic properties and/or cryptographic algorithms. For example, a cryptographically protected communication session may, for messages received over the cryptographically protected communication session, provide assurances of authenticity, integrity, confidentiality, or any combination thereof. Authenticity may refer to assurances that the message was created by a party purporting to be the author of the message. Integrity may refer to assurances that the received message was not modified either intentionally (e.g., by a malicious party) or unintentionally (e.g., as a result of signal loss during transmission) from its original form when the message was transmitted. Confidentiality may refer to assurances that the message may only be understood by the recipient and/or other intended parties (e.g., by transmitting an encrypted message that may only be decrypted by the recipient).

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

Figure 3:
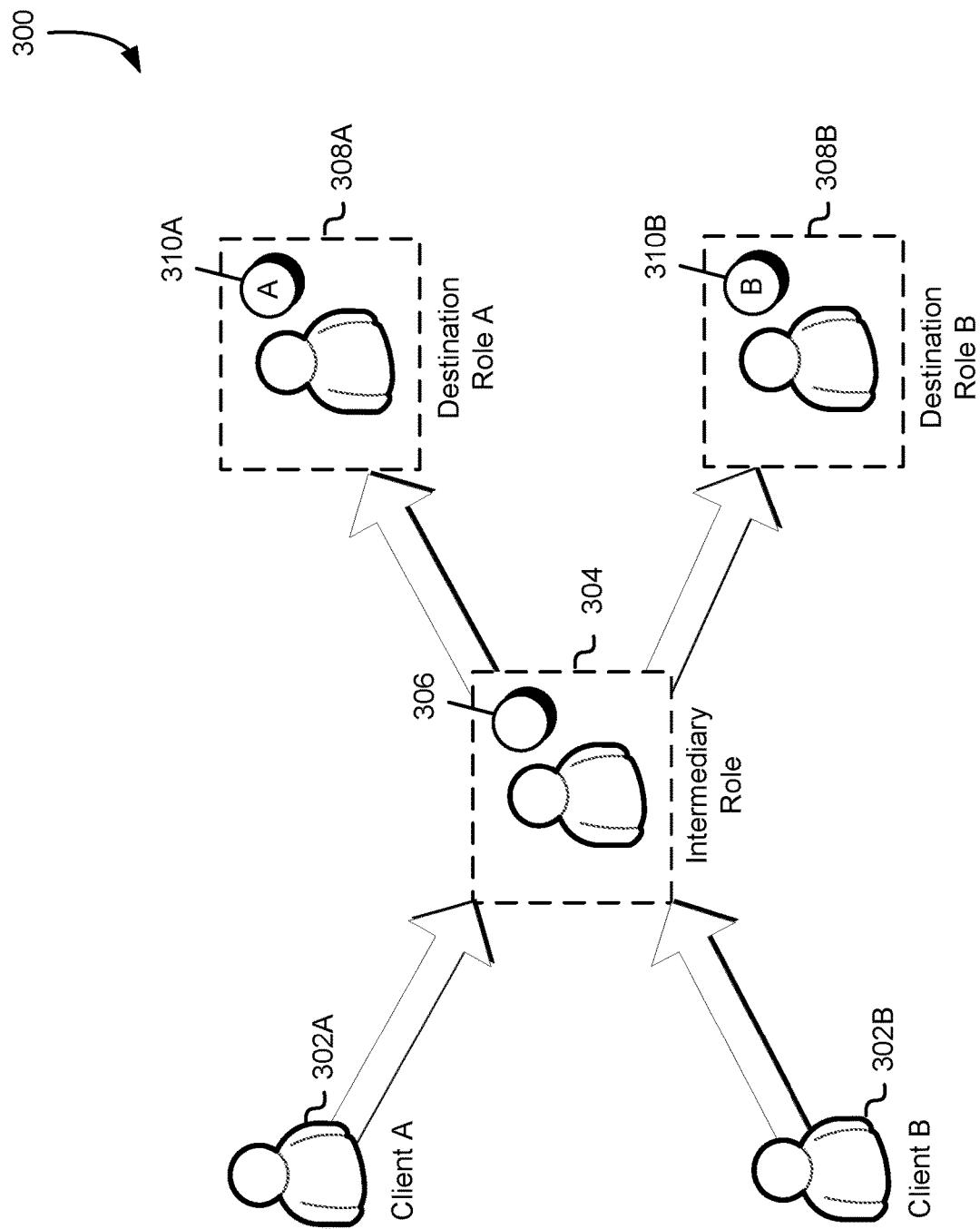
FIG. 3 shows an illustrative example for how clients assume an intermediary role and then one or more different destination roles.

FIG. 3 illustrates an environment in which various embodiments can be implemented. The computing environment 300 illustrates an example where two separate clients 302A and 302B assume an intermediary role 304 and after assuming the intermediary role are able to assume different destination roles 308A and 308B.

In the environment 300, a client may use an authentication service (not shown in FIG. 3) to assume a role. In the environment 300, a first client 302A may assume an intermediary role 304 and receive a security token 306 for the intermediary role, for example, in the manner described above in connection with FIGS. 1 and 2. After assuming the intermediary role 304, the client 302A may request to assume a first destination role 308A, for example, by providing a resource name identifier associated with the first role as part of a request to an authentication service. The client 302A may further provide the intermediary token 306 to assume the destination role 308A. The authentication service may verify the identity of the client 302A, determine that the client 302A made the request while assuming the intermediary role 306, and determine that the client 302A may assume the destination role 308A, and provide to the client 308A the security token 310A for the first destination role.

Similarly, a second client 302B may assume the same intermediary role 304 and receive the same intermediary token 306. However, the client 302B may instead request to assume a second destination role 308B and receive a second security token 310B if an authentication service successfully verifies the identity of the client 302B, determines that the client 302B made the request while assuming the intermediary role 304, and determines that the client 302B may assume the second destination role 308B, and provides to the client 308B the security token 310B for the second destination role.

In some embodiments, the clients need not specify the destination roles 308A and 308B that they wish to assume. After assuming the intermediary role 304, a client (e.g., either client 302A or 302B) may make a request to the authentication service to assume a destination role. As part of the request, the requesting client may provide identity information that allows the authentication service to determine what role the requesting client should assume.

For example, the first client 302A may, after assuming the intermediary role 304, make a request to the authentication service to assume a role and provide its own resource name identifier as part of the request. The authentication service may authenticate the client 302A, and then determine (e.g., by querying a policy repository) that the requesting client 302A may assume the first destination role 308A and provide the corresponding security token 310A in the response.

Following the same example, if the second client 302B assumed the intermediary role 304 and made a request to the authentication service to assume a role and provided its own resource name identifier as part of the request, the authentication service may, after authenticating the client 302B, determine that the requesting client 302B may assume a different destination role 308B and provide the security token 310B as part of the response. Note that in both preceding example requests to assume a role, the identity of the requesting client was used by the authentication service to determine which role to assume.

Figure 4:
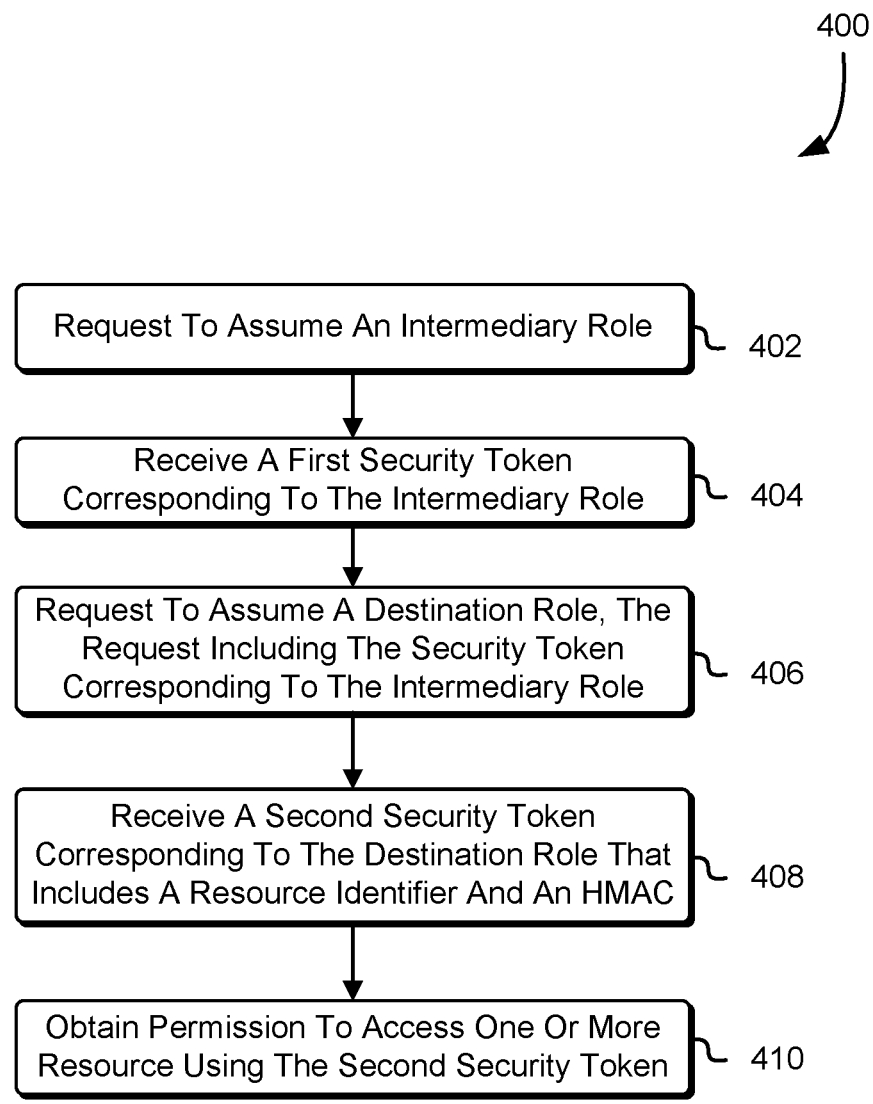
FIG. 4 shows a diagram illustrating a process for obtaining permissions to one or more resources by assuming a destination role.

FIG. 4 shows an illustrative example of a process 400 that may be performed to obtain access to resources that may require permissions of a destination role. Generally, the process 400 may be performed by any system that is operable to function as a client described above in connection with FIGS. 1-3. A party, such as a client, may request 402 to assume an intermediary role. As part of the request, the party may provide a resource name identifier of the role requested. Furthermore, in some cases identity information of the requestor, such as the requestor's resource name identifier, may be required as part of the request. An authentication module may be used to authenticate the requestor's identity—for example, the requestor may be required to sign a digital certificate containing the requestor's own resource name identifier with a private key that corresponds to a public key that is known to be associated with a particular identity (e.g., published by a certificate authority). The authentication module may, upon receiving the digital certificate, obtain the public key corresponding to the identity described by the resource name identifier included in the digital certificate and by checking the digital signature with the public key, verify whether the requestor is who it purports to be in the digital certificate.

It may be required that the intermediary role be assumed before assuming a destination role, and such a requirement may be enforced by an authentication service. In response to the request to assume an intermediary role, an authentication service may verify that the requestor is privileged to assume the intermediary role, for example, by checking a policy repository that includes a list of all principals (e.g., user accounts) with permissions to assume the role. The requestor may receive 404 a first security token corresponding to the intermediary role. In some embodiments, the security token may be an HMAC or include an HMAC. The HMAC may be created by executing a one-way hash function over a message using a cryptographic key that is kept secret by a token management service such as the token management service described above in connection with FIG. 2. The message being hashed may include information that indicates an assumption of the intermediary role.

A client may then request 406 to assume a destination role, the request including the security token obtained when assuming the intermediary role. In some embodiments, the request, including the token, may be routed to an authentication service. The authentication service may determine that the request to assume the destination role requires that the requestor first have assumed the intermediary role. A token management service may be used to generate an HMAC over a message that includes information indicating assumption of the intermediary role. The generated HMAC may be compared against an HMAC provided as part of the request (e.g., provided as the security token or included therein) to determine its authenticity. If the HMAC is determined to be authentic and the message includes an indication that the requestor has assumed the intermediary role, then the token management service may obtain a security token from the token repository (e.g., as described in connection with FIG. 2) that may be used to assume the destination role.

The requestor may receive 408 a security token for the destination role that includes a resource identifier corresponding to the destination role and an HMAC. In some embodiments, the HMAC includes information that indicates an assumption of the destination role. This security token may be used to assume the destination role and obtain 410 access to one or more resources. Access may be obtained by providing, as part of a request to access a resource, the security token. An authorization module or service (e.g., the authorization module described in connection with FIG. 2) may determine that the request to access a particular resource may be granted to a principal assuming the destination role. A token management service may be used to generate an HMAC over a message that includes information indicating assumption of the destination role. The generated HMAC may be compared against an HMAC provided as part of the request (e.g., provided as the security token or included therein) to determine its authenticity. If the HMAC is determined to be authentic and the message includes an indication that the requestor has assumed the destination role, then the authorization module may route the request to be fulfilled by a backend service having access to resources, such as those described above in connection with FIG. 2.

Figure 5:
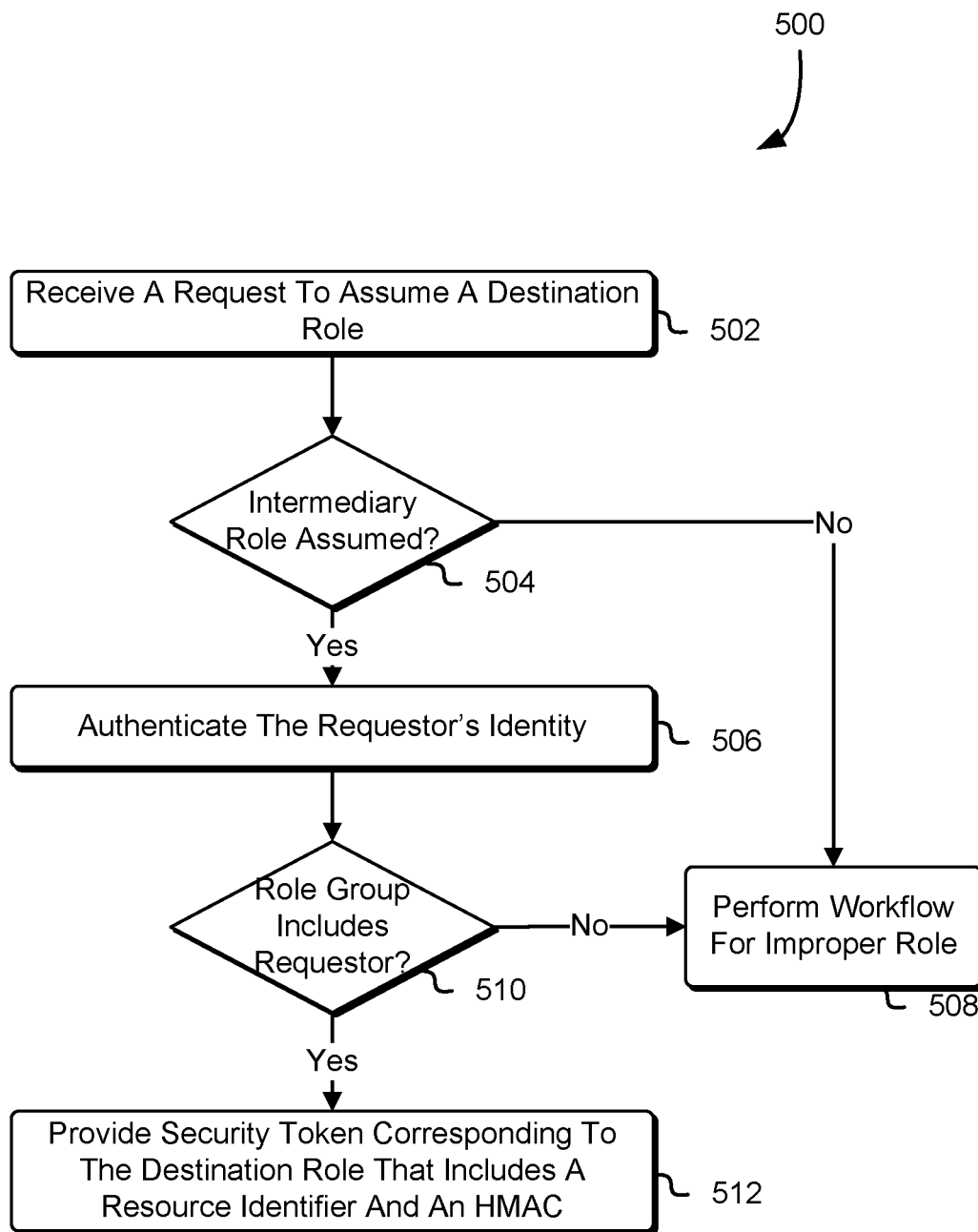
FIG. 5 shows a diagram illustrating a process for fulfilling a request to obtain permissions that may be used to access one or more resources by assuming a destination role.

FIG. 5 shows an illustrative example of a process 500 for assuming a destination role. Generally, the process 500 may be performed by any system that is operable to function as an authentication service described above in connection with FIGS. 1-3.

A system such as an authentication service may receive 502 a request to assume a destination role such as an API request. The request may include a resource name identifier of the destination role for which the requestor will assume and a security token for a role that the requestor has assumed. The system may check 504 whether the requestor has assumed a required intermediary role such as the intermediary role described above in connection with FIG. 1. An authentication service may verify the intermediary role has been assumed using techniques described above in connection with FIGS. 1-3. Additional information may also be checked, such as whether the security token has expired. In some embodiments, an HMAC may include an expiration time after which the security token is invalid and that the intermediary role is not validly assumed.

In some embodiments, the resource name identifier of the destination role to assume is not provided in the request and the authentication service may determine (e.g., using a token management service) the destination role. In some embodiments, the client provides its identity information and the token management service determines, after verifying the authenticity of the client's identity information, one or more appropriate destination roles by obtaining a list of destination roles that the client may assume.

If a system such as the authentication service determines that the requestor has not assumed the intermediary role, the system may determine that the requestor should not be allowed to assume the destination role due to not having assumed the intermediary role. The system may perform 508 a workflow related to the improper role. The workflow may include responding to the request with an indication that the requestor should assume the intermediary role before attempting to assume the destination role. In some embodiments, the system may perform no action and allow the request to time out.

Conversely, if the system determines that the requestor has assumed the intermediary role, it may authenticate 506 the requestor's identity using the authentication service and verify which roles the requestor (e.g., client) may assume. A collection of roles that a client may assume may be obtained from a policy repository accessible to the token management service and check 510 whether the destination role (e.g., a role group) includes the requestor's identity. If the collection of roles that the requestor may assume does not include the destination role, a workflow may be performed 508. In some embodiments, this may be the same workflow that is performed when a system or subsystem determines that the intermediary role was not properly assumed as discussed above. However, in other embodiments a separate workflow may be performed, for example, by providing a response to the request that indicates that the client does not have permission to assume the destination role.

Conversely, if the collection of roles that the requestor may assume includes the requestor identity, the system may provide 512 a response to the requestor that includes a security token corresponding to the destination role and usable to assume the destination role. In some embodiments, the security token includes a resource name identifier for the destination role and an HMAC that may be used to assume the destination role. The response may be in accordance with other responses described above that allow a client to assume a destination role.

Figure 6:
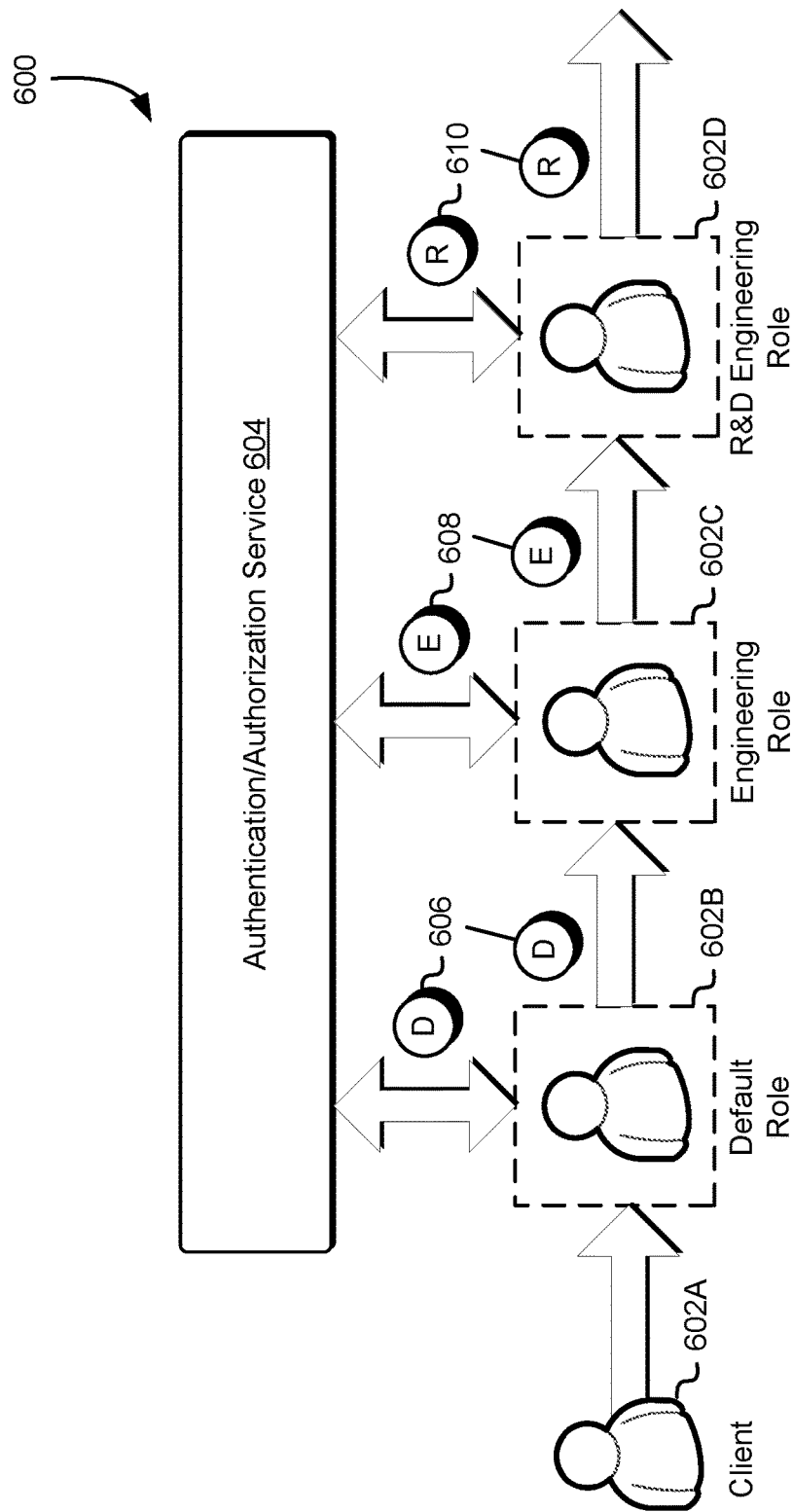
FIG. 6 shows an illustrative example of a first intermediary role, a first destination role that also serves as a second intermediary role, and a second destination role.

FIG. 6 illustrates an environment in which various embodiments can be implemented. The computing environment 600 illustrates a client 602A and a chain of roles 602B, 602C, and 602D that may be sequentially assumed. In some environments, an organization may have multiple levels of permissions. For example, an organization may have a default role 602B that any employee may assume, but only engineers may assume an engineering role 602C that may grant access to resources such as source code. Further, only some engineers may be allowed to assume an R&D engineering role 602D that grants additional permissions to resources that may be required, for example, for cutting edge research.

As illustrated in FIG. 6, the client 602A may assume a default role 602B by obtaining a security token 606 associated with the default role from an authentication/authorization service 604 and, after assuming the default role assume the engineering role 602C by obtaining a security token 608 associated with the engineering role. This process may be performed in a similar manner as described above in connection with FIG. 1, for example, using an authentication/authorization service implemented in the manner described above in connection with FIG. 1.

This process may be extended a second time such that assumption of an R&D engineering role 602D requires first assuming an engineering role 602C. The process for assuming the R&D role may be similar to that of assuming the destination role in FIG. 1 in the respect that when assuming the R&D engineering role 602D, the authentication/authorization service 604 may determine that the client has assumed engineering role 602C by receiving the engineering role security token 608. The authentication/authorization service 604 may determine that token is valid—that is, that a required intermediary role (in this case, the engineering role 602C) has been assumed and provide a R&D engineering role security token 610 that allows assumption of a destination role (in this case, the R&D engineering role 602D). This process may be chained a third time, or more depending on the hierarchical needs of an environment. Each role may have different access permissions with respect to resources within the system.

Figure 7:
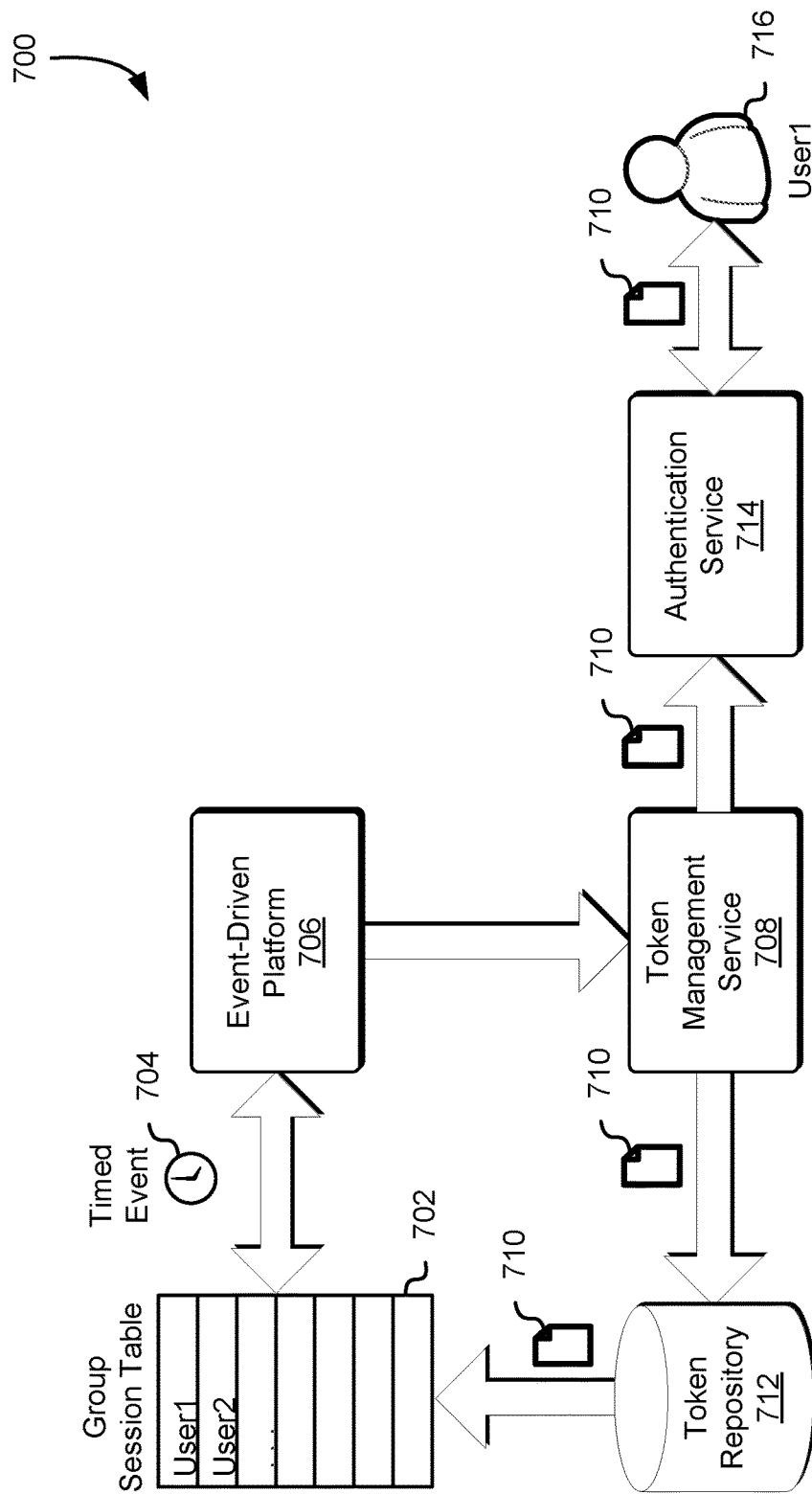
FIG. 7 shows an illustrative example of an event-driven platform updating a security token in response to a timed event.

FIG. 7 illustrates an environment in which various embodiments can be implemented. The computing environment 700 illustrates an example where credentials for assuming role are updated and distributed. In some embodiments, there may exist a group session table 702 that stores records corresponding to principals (e.g., users) that are part of a role-group and have an active session—i.e., a collection of principals that have assumed a role and obtained a corresponding security token for that role. For example, FIG. 3 shows a table with multiple users "user1", "user2", etc. that have assumed a role. A timed event 704 may refer to a temporal event that should trigger the performing of work against the table to update its security tokens. As an example, security tokens may be set to expire every 15 minutes. After the expiration period has elapsed, the expired security token may no longer be usable (e.g., to assume a role or access resources) and a new security token may need to be generated.

An event-driven platform 706 may determine when an event occurs and perform custom logic in response to the event being triggered. An event trigger may, for example, be the system's date/time exceeding the date/time of an expiration time. The event-driven platform 706 may be implemented using software, hardware, or some combination thereof. In some embodiments, distributed computing resources may provision and load custom logic/code in response to the event, run the code, and then unload the code and de-provision the computing resource. The event-drive platform 706 may be hosted in the service described above in connection with FIG. 1 or may be a separate component. An event-driven platform 706 may be implemented using an event-drive architecture. When a security token, is created, the event-driven platform 706 may be notified (e.g., by the token management service) that a new security token has been created and the event-driven platform may then obtain the newly generated security token, determine when the token will expire, and specify custom code or logic that should be run when the token is no longer valid (e.g., when it expires). In some embodiments, a backend system (such as those described above in connection with FIG. 2) may have a task scheduler that may be used to schedule periodic tasks. The scheduled tasks may furthermore have their schedules adjusted (e.g., if a token is re-generated due to a key rotation) or canceled (e.g., if the role associated with the token is deleted). In some embodiments, when a security token is generated, the token management service may automatically notify the event-driven platform that a new token has been generated and the event-driven platform may receive the notification and schedule a task to be run to re-generate the token at a later time.

In response to detecting a timed event 704, the event-driven platform 706 may communicate with a token management service 708. The event-driven platform may provide an indication to the token management service that the security token associated with a role (e.g., the role associated with the group session table 702) should be re-generated. The token management service 708 may be any token management service such as those described above. The token management service may generate a new security token (e.g., HMAC) 710. In some cases, the expired and newly generated security tokens are both generated at least in part by using a one-way function and a cryptographic key. The new security token 710 may be provided to a token repository 712 that stores security tokens. The token repository may contain one or more database tables that each correspond to active sessions for a role, and may include the group session table 702 shown in FIG. 7. In some embodiments, the token management service 708 may walk the entire group session table 702 and in each row entry corresponding to a principal of the group, write the newly generated security token 710. The expired security token may also be removed from rows of the group session table 702 (e.g., by being overwritten by the new security token 710). Note that while FIG. 7 illustrates an example where active sessions of a group are stored in a database, that active sessions may be maintained and stored in various ways. For example, group session information may be stored in various types of data structures such as one or more vectors, maps, linked lists, and any combination thereof. Additionally, the group session information may be stored at least in part in data files which may be used in conjunction with or in place of databases. Furthermore, group session information may be stored in volatile memory (e.g., RAM of one or more computer systems), non-volatile memory (e.g., persisted in a hard disk drive), or some combination thereof.

After the security token is stored in the token repository, a client 716 may request the token via an authentication service 714. The authentication service 714 may verify that the requesting client has permissions to access the token. For example, in an embodiment in accordance with FIG. 7, "User1" provides a request to the authentication service 714 to assume a role. The authentication service 714 may determine that User1 has assumed a required intermediary role (e.g., as discussed above) and verify via the appropriate table in the token repository that the requestor has permissions to assume the role. The generated token 710 may be provided to the client 716 after verifying that the requestor 716 has permission based on querying the group session table 702.

Figure 8:
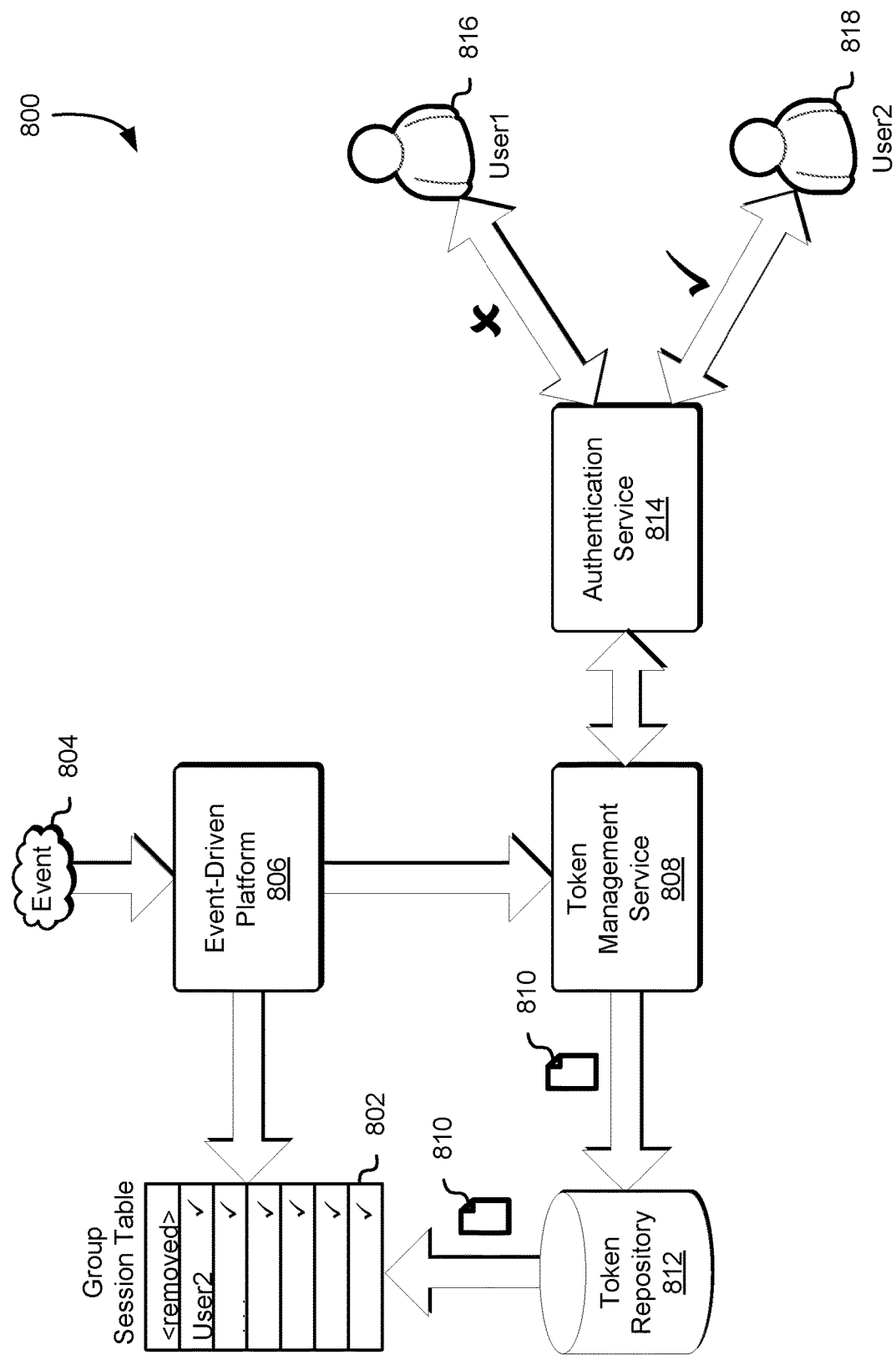
FIG. 8 shows an illustrative example of an event causing an event-driven platform to revoke permissions for a user account on a role.

FIG. 8 illustrates an environment in which various embodiments can be implemented. The computing environment 800 illustrates an example where credentials may be revoked and/or redistributed. Credentials may be revoked for various reasons. Various types of events 804 may trigger the system to revoke credentials. For example, an administrator may remove a user from a role or role-group and the user may no longer be allowed to assume the role or access resources. Additionally, revocation may occur in response to an event, such as detecting suspicious activity that indicates a user account may be compromised (e.g., login from an unexpected geographical location).

The event-driven platform 806 may be in accordance with an event-driven platform described above in connection with FIG. 7. An event-driven platform may monitor events that may occur within a system or service, such as login attempts. An event-driven platform may detect a condition that would require revocation of credentials, such one or more unauthorized login attempts to the user. The event-driven platform may have custom logic/code that it runs upon detecting certain events. For example, upon detecting that a user's account may have been compromised, the event-driven platform may determine that the user's access to a role or role-group should be revoked (and possibly restored later after verifying that the account has been secured). For purposes of illustration, FIG. 8 shows an environment where the user account associated with "User1" has potentially been compromised. The event-driven platform 806 may remove User1 from a group session table 802 that stores information regarding which principals has assumed a role and obtained a security token for that role. In some embodiments, the database may contain one or more HMACs that may be used as security tokens. The token management service 808 may generate a new security token 810 by rotating cryptographic keys. A key rotation may occur by using a one-way function and a new cryptographic key different from the cryptographic key used to generate the security token being revoked. The new security token 810 may be stored in the token repository 812, for example, using techniques described above in connection with FIG. 7. Note that because the row entry for User1 was removed, no database entry will associate User1 with the new security token. Thus, when User1 816 requests to obtain the security token from the authentication service 814, it will fail to do so because the token associated with the user's login session has been removed (i.e., revoked) from the database table. Conversely, when User2 818 requests to assume the role corresponding to the group session table 802, the request will be successfully fulfilled because User2 will be found in the group session table 802. In some embodiments, the revocation can be scoped to a particular session, such that if a user has multiple active sessions, each active session for the user may be stored in the group session table 802 and the revocation may be performed such that only the active session of a single device of a user has its credentials revoked. Of course, two or more active sessions of a user may be revoked in response to an abnormal event as well. The group session table 802 shown in FIG. 8 may be implemented in accordance with techniques described above in connection with FIG. 7.

An event-driven platform 806 may be implemented using an event-driven architecture. When a specific event such as a login occurs, the event-driven platform 706 may be notified (e.g., by the authentication service) of that event and the event-driven platform may further receive additional information regarding the login, which may be obtained separately (e.g. from a database that records login attempts and any associated metadata that may be needed). The event-drive platform 706 may determine how to handle the event, which may be handled in part by custom code or logic that is selected based on information obtained about the login (e.g., custom code relating to determining the location of a smartphone device attempting the login over an Internet as compared to a login attempt by a server over a local area network). In some embodiments, the event-drive platform 806 may subscribe to notification messages from the authentication service for events and the authentication service may invoke callback function (such as a lambda function) in response to an event that the event-drive platform subscribes to receive notifications for.

Furthermore, User1 will not be able to use the revoked security token. For example, if User1 attempts to use a revoked token to assume a role, the authentication service will receive the request. In some embodiments, an HMAC may be included in the token, and the token management service may be used in part to verify the HMAC by generating an HMAC using the new cryptographic key. The generated HMAC and the HMAC provided by User1 will be different because different cryptographic keys were used in the one-way hash function for the generated HMAC and provided HMAC.

Figure 9:
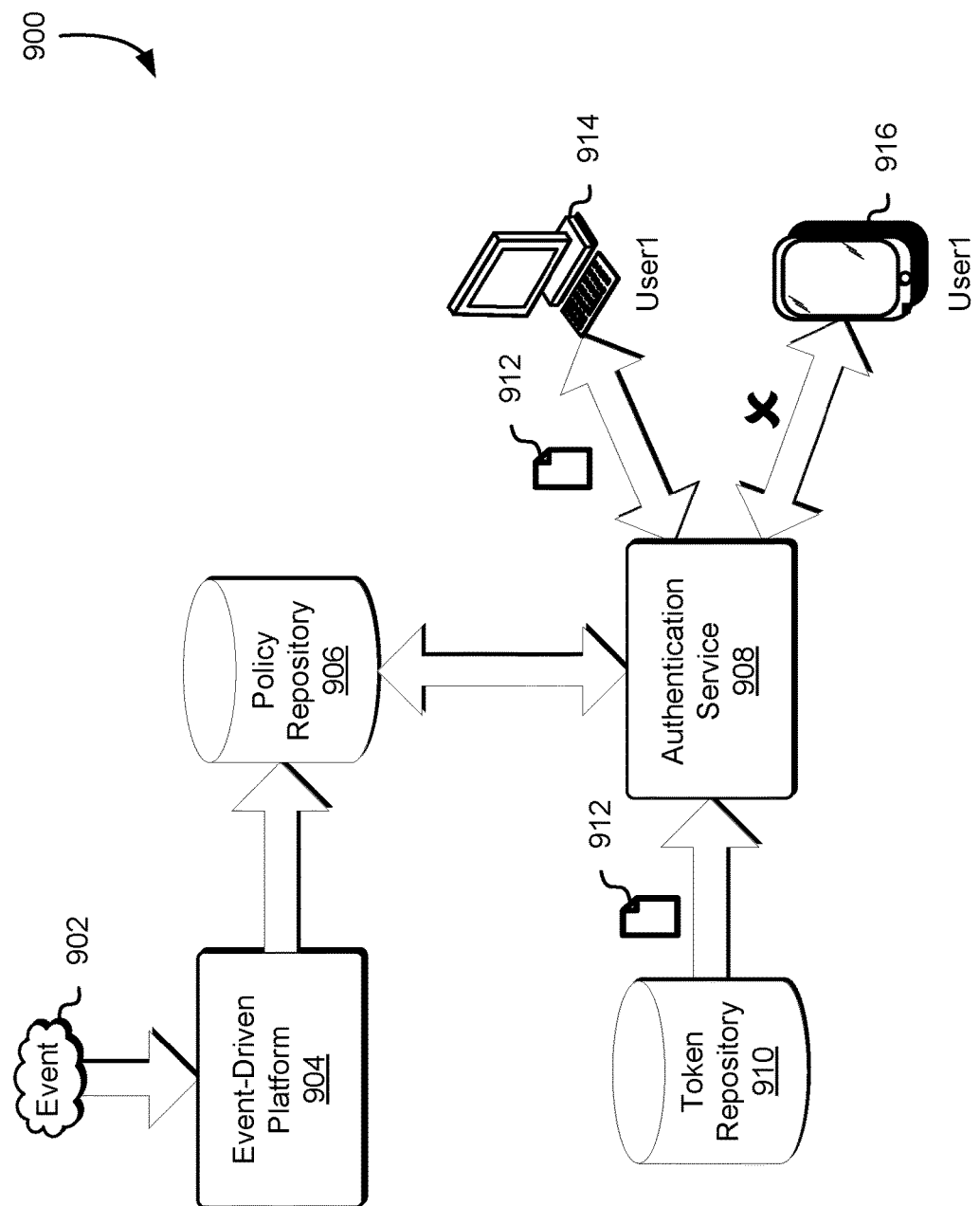
FIG. 9 shows an illustrative example of using a deny policy to deny access to a security token to one device of a user account but to allow access to the security token to another device of the same user account.

FIG. 9 illustrates an environment in which various embodiments can be implemented. The computing environment 900 illustrates an example where credentials may be revoked and/or redistributed. Credentials may be revoked for various reasons, as discussed above. Various types of events 902 may trigger the system to revoke credentials. As an example, an event 902 that may trigger a revocation may include an attempted login by a user from a device 916 that may indicate that the user account was compromised. As an example, a user such as "User1" may typically login from a computer device 914 that is located in an organization's office, datacenter, etc. An abnormal login attempt may be detected from another device 916. Various criteria may be used to determine when a login or login attempt is considered abnormal, including the device type (e.g., cell phone, laptop, desktop), geolocation, IP (internet protocol) address, login time (i.e., early morning, midday, late evening) and various other types of identification information.

An event-driven platform 904 may be configured in the manner described above in connection with FIG. 8, but may, instead of or in addition to timed event, also be configured to perform custom logic/code based on other types of events, such as upon detecting an abnormal login or login attempt. In some embodiments, the event-driven platform may monitor login attempts to a system or service, which may be handled by a login service, or some combination of other services such as the authentication service and/or authorization service. The event-driven platform 904 may be used, upon detecting an abnormal login attempt, to determine that credentials should be revoked with regard to the abnormal login. In some embodiments, the event-driven platform may determine that credentials should be revoked and furthermore determine how revocation should occur. In some cases, the revocation should occur by performing a key rotation as described above in connection with FIG. 8 and removing the user associated with the abnormal login attempt from a role or role-group. However, in other cases, the system may revoke credentials for one or more devices but not others.

In some embodiments, such as those in accordance with FIG. 9, the event-driven platform may detect an abnormal login attempt by a user from a device 916. The event-driven platform 904 may determine that the abnormal login is of a type that the login credentials should be revoked based on some identifying information relating to the login such as IP address. In some cases, the event-driven platform 904 may use a policy repository 906 to revoke credentials for one or more IP addresses. The policy repository 906 may store information regarding policies which grant and/or deny access to resources such as user accounts. In this case, the event-driven platform 904 may provide the IP address (or a range of IP addresses) to the policy repository and instructions to deny access to the user account. The policy repository 906 may create one or more policies that deny access to one or more resources (such as user accounts), such as by creating policy entries (e.g., rows in a database), with an indication to deny access to a user account for a specific IP address. The denial policies may be broader—the deny policy may be directed towards a set of resources (e.g., deny access to all user accounts) and/or deny access for a range of IP addresses or device types (e.g., deny access to a user account for all mobile devices). An IP address may refer to an IPv4 or IPv6 address.

An authentication service 908 may be used to determine whether and how to fulfill requests for access to resources. In some embodiments, the authentication service is used to login to user accounts, assume roles, and perform other services that require a user to authenticate the user's identity. As an example, a user may login to a first device 914 and attempt to assume a role. As part of the request, the authentication service may determine the IP address of the requestor. The authentication service may query a policy repository 906 to determine that there is an associated policy allowing the user to assume the requested role and also determine that there are not any policies explicitly denying an IP address associated with the request from assuming the role. A security token 912 for assuming the requested role may be obtained from the token repository 910 that may be in accordance with those described above, and provided to the first device 914.

However, consider a second example: a user from a second device 916 may attempt to assume a role. As part of the request, an abnormal or unexpected IP address for the device may be detected by the event-driven platform 904, and a policy denying access to resources requested by the IP address may be generated by the event-driven platform 904 and stored in the policy repository 906. The authentication service may determine that there is an associated policy allowing the user to assume the requested role, but the IP address associated with the request has an associated denial policy and therefore denies the request. In some embodiments, a denial policy will supersede any contradicting policies allowing access to a resource. Thus, a request from the second device 916 to assume a role may be denied.

Figure 10:
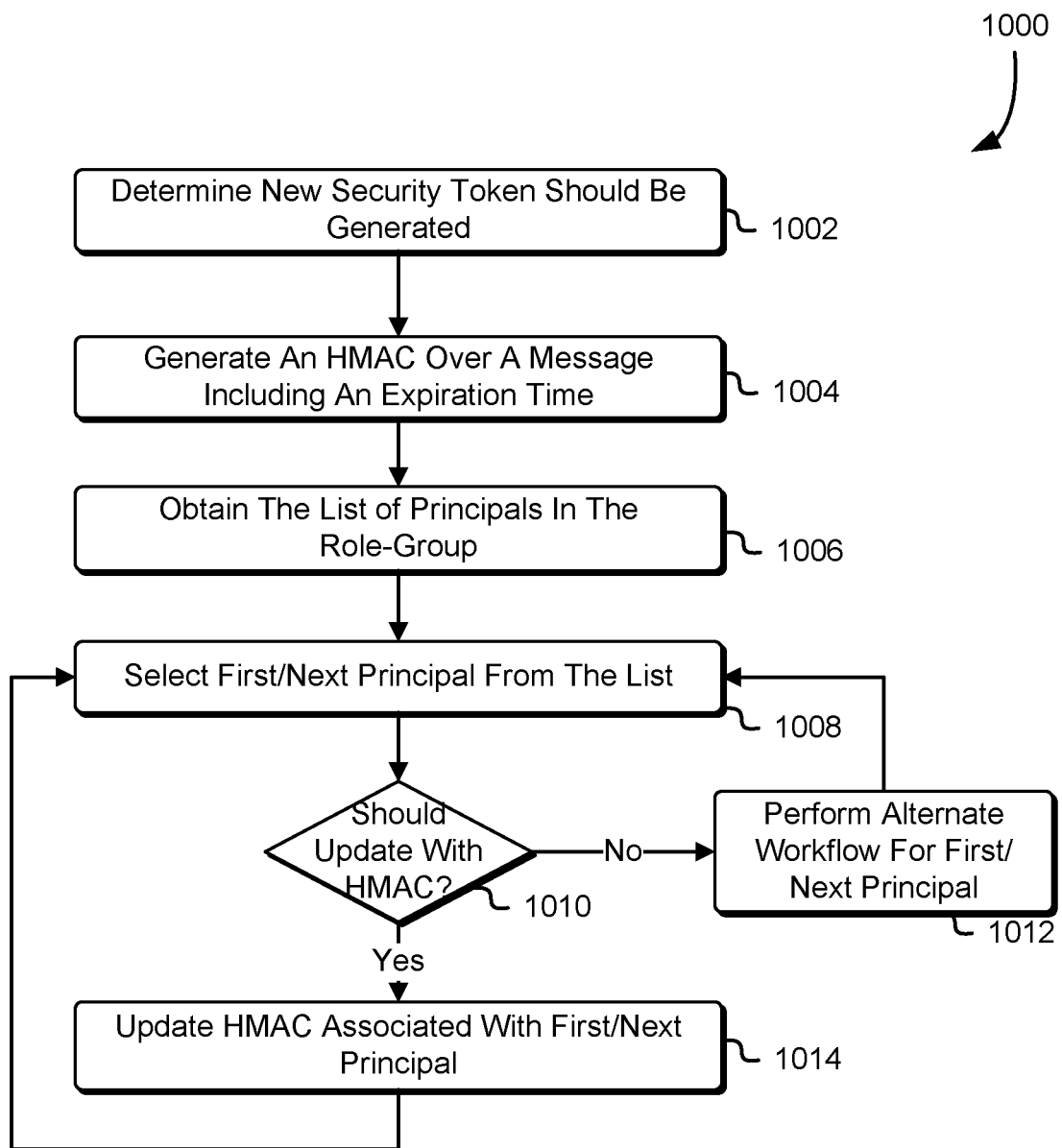
FIG. 10 shows a diagram illustrating a process for generating a new security token for a role.

FIG. 10 shows an illustrative example of a process 1000 for generating new security tokens based on events such as those described above in connection with FIGS. 7-9. Generally, the process 1000 may be performed by various systems described herein such as an event-driven platform described above in connection with FIGS. 7-9. A system, which may include or be an event-driven platform, may determine 1002 that a new security token should be generated. The determination may be based on various criteria, such as determining that a time-based event has occurred (e.g., token expiration) or that a trigger-based event (e.g., abnormal login attempt) has occurred.

A HMAC over a message that includes an expiration time may be generated 1004. The HMAC may be a security token or may be included as part of a security token. In some cases, the system may provide additional information regarding how a new security token should be generated. For example, a new security token may be generated by a key rotation where a new cryptographic key is obtained or generated, and the new key is used to generate the HMAC. In other cases, the same cryptographic key that was used to generate previous tokens (e.g., expired tokens) for the role may be re-used, but a message with a new expiration time may be generated. It should be noted that while HMACs are used to illustrate the process 1000 shown in FIG. 10, any sort of message that uses a one-way hash and cryptographic key to generate a message that can be used to verify the authenticity of a message may be used in place of an HMAC.

The system may obtain 1006 a list of principals of a role-group. In some examples, this step may include accessing a database table that includes a list of users that may assume a role. This step may be performed in accordance to various processes described above, such as by querying a database table. Note that in some cases, the list may not include all users of a group—for example, in the case of a revocation the user whose permissions are being revoked may be excluded from the list if the list is obtained prior to the user being removed from the list. As an example, a list of principals may be a collection of database rows, each row corresponding to a principal having permissions to assume a role-group and each row further including a copy of an HMAC (e.g., an expired HMAC).

After or concurrent to obtaining the list of principals, the system may select 1008 a first or next principal from the list. The principal selected may be a member of the group. The selection may be made concurrent to obtaining the list of principals in cases where a database cursor seeks to a first entry in a database table and sequentially walks the database table to access subsequent principals in the list. In some embodiments, additional steps are taken to determine whether 1010 the principal should be updated with the generated HMAC. Determining whether the principal should be updated with the HMAC may depend in part on how the determination to generate a new security token was made—if the token generation is being made based on the expiration of an existing HMAC, then it may be the case that each principal in the list should be updated with the HMAC. Conversely, token generation in response to a revocation may indicate that at least one principal should not be updated with the HMAC. If the determination is made to update 1014 with the HMAC, then an old HMAC may be removed and replaced by the newly generated HMAC. In some embodiments, the system may also provide an indication that the HMAC associated with a principal has been updated, and may be used in part to publish updates to subscribers of a publication/subscription service. An alternate workflow may be performed 1012 if no update should be made.

Figure 11:
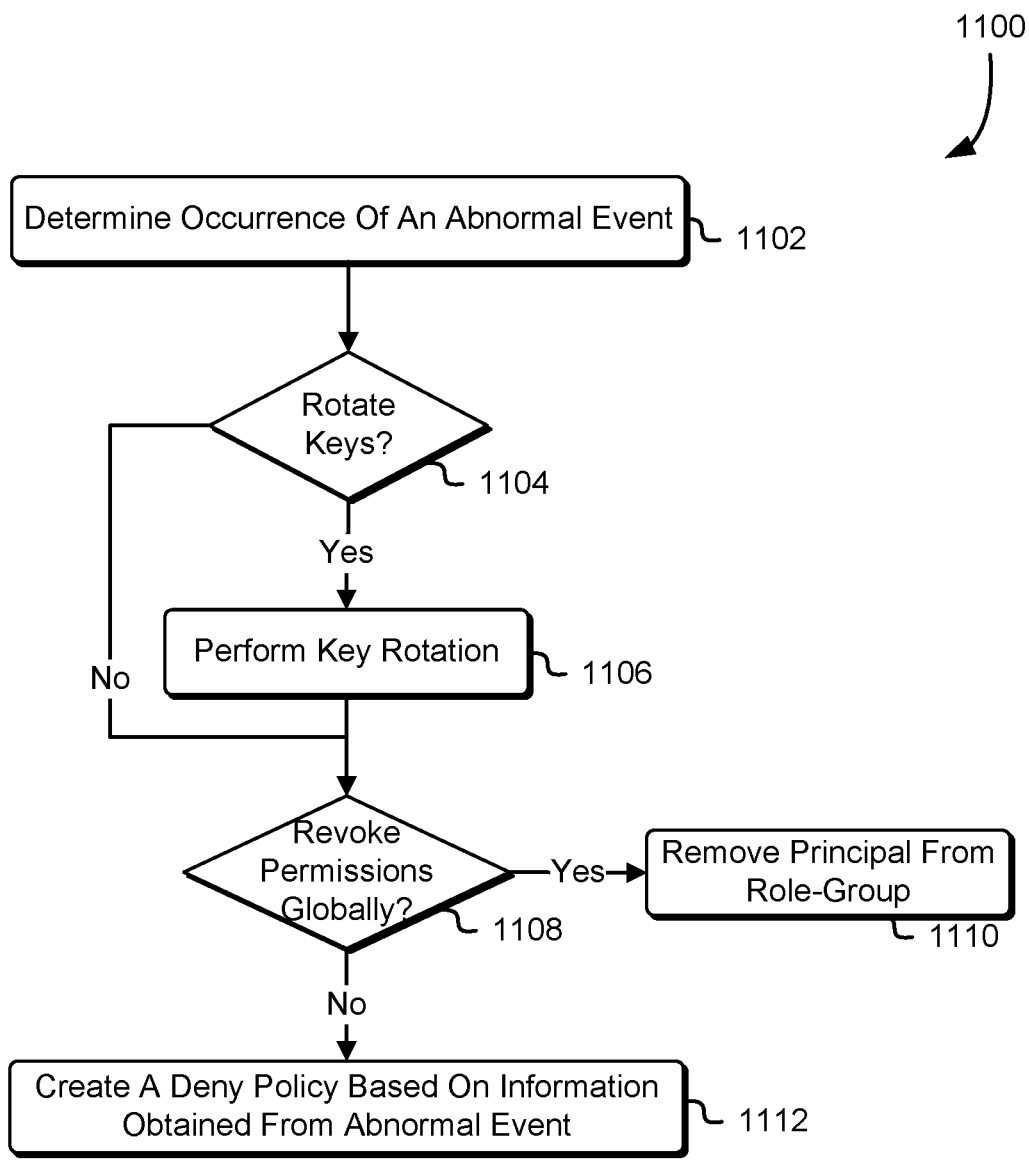
FIG. 11 shows a diagram illustrating a process for performing a key rotation on a role in response to detecting an abnormal event.

FIG. 11 shows an illustrative example of a process 1100 for revoking credentials. Generally, the process 1100 may be performed by various systems described herein such as an event-driven platform described above in connection with FIGS. 7-9. A system, which may include or be an event-driven platform, may determine 1102 the occurrence of an abnormal event, which may be in accordance with techniques described above in connection with FIGS. 7-10. As an example, an abnormal event may be an attempted login to a network from an unknown device (e.g., a device that has never previously attempted to connect to the network) and/or from an unexpected location (e.g., an IP address from a geolocation that is not expected).

Upon determining that an abnormal event has occurred, the system may handle the occurrence of the abnormal event at various levels in the system. The system may determine whether 1104 to perform a key rotation. The key rotation may be used as a safeguard to invalidate security tokens that were previously distributed, as in the case where the abnormal event was detected after the fact. If a key rotation is determined to be appropriate, a key rotation may be performed 1106 in the manner described above in connection with FIG. 8. Regardless of whether a key rotation was performed, the system may further determine whether 1108 to revoke permissions for a principal globally—that is, across an entire system. A global revocation may be performed by removing 1110 the principal from the database table that includes a list of all principals that have access to a role. If the system determines that a global revocation is not appropriate, the system may instead leave the principal in the role-group and create 1112 a deny policy based on information obtained from the abnormal event such as an IP address or a range of IP addresses that includes the IP address of the device that triggered the abnormal event. The deny policy may be stored in a policy repository as described above.

Figure 12:
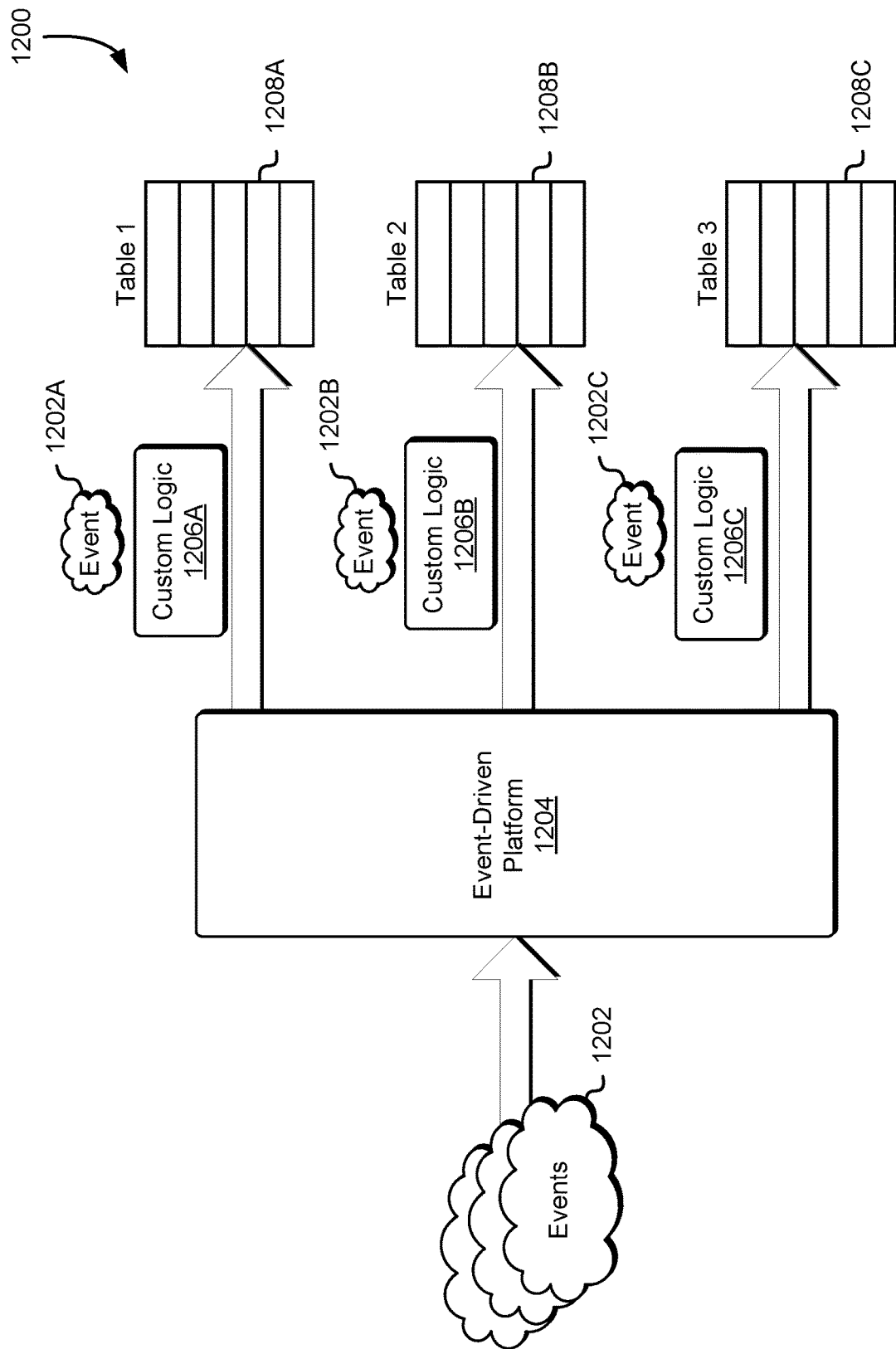
FIG. 12 shows an illustrative example where sessions are spliced at an individual table level to perform custom logic.

FIG. 12 illustrates an environment in which various embodiments can be implemented. The computing environment 1200 illustrates an example where sessions are spliced to an individual table level and perform custom logic, which may be in the form of executable code. An event-driven platform 1204 may receive and/or monitor events 1202 in the manner described above. In some embodiments, the events that the event-driven platform 1204 monitors includes login sessions. An event-driven platform may receive events 1202 that may correspond to multiple login sessions and may require the invocation of various types of business logic that may be different between a first session and a second session.

The event-driven platform 1204, which may be implemented in accordance with those described above in connection with FIGS. 7-9, may be further configured to receive events from multiple sessions (e.g., login sessions from different users). The event-driven platform may receive the events 1202 and determine, either internally (e.g., using a component of the event-driven platform) or externally (e.g., by delegating to another service) how to splice the events which may operate on different logics and/or different tables. As an example, the event-driven platform may include a mapping of custom logics to corresponding tables that are used for a login session.

Custom logic 1206A, 1206B, and 1206C may include executable code, routines, function pointers, input parameters to a routine, callback functions, API requests, or any combination thereof. As an example, the event-driven platform may include a mapping of routines to tables that indicates which routines should be invoked when a login session corresponds to a particular table. Invoking a routine may include executing code or providing executable code as part of a request. FIG. 12 shows multiple events 1202 that are received by the event-driven platform 1204 and spliced to their respective sessions, and for each session, custom logic 1206 is run against the particular table 1208 that corresponds to the session. The custom logic 1206A that is run for a first session against a first table 1208A may be different from the custom logic 1206B that is run for a second session against a second table 1208B but need not be the case—the custom logic may, for some tables, be the same in either a literal (e.g., both sessions utilize a function pointer that runs the same executable code from memory) or logical (e.g., the same functional outcome) sense. In some cases, the custom logic may use information contained in the events 1202A, 1202B, and 1202C, to perform a workflow.

The tables 1208A, 1208B, and 1208C may be tables within a token repository such as those described above in connection with FIGS. 1-9. The tables may be used as part of validating a login session or a session where a principal attempts to assume a role where the table corresponds to the role being assumed. In some embodiments, custom logic may be performed in a manner that does not access a table corresponding to a role or role-group. For example, a custom logic (not shown in FIG. 12) may be run in which a deny policy may be generated in a policy repository such as the policy repository described above in connection with FIG. 9.

Figure 13:
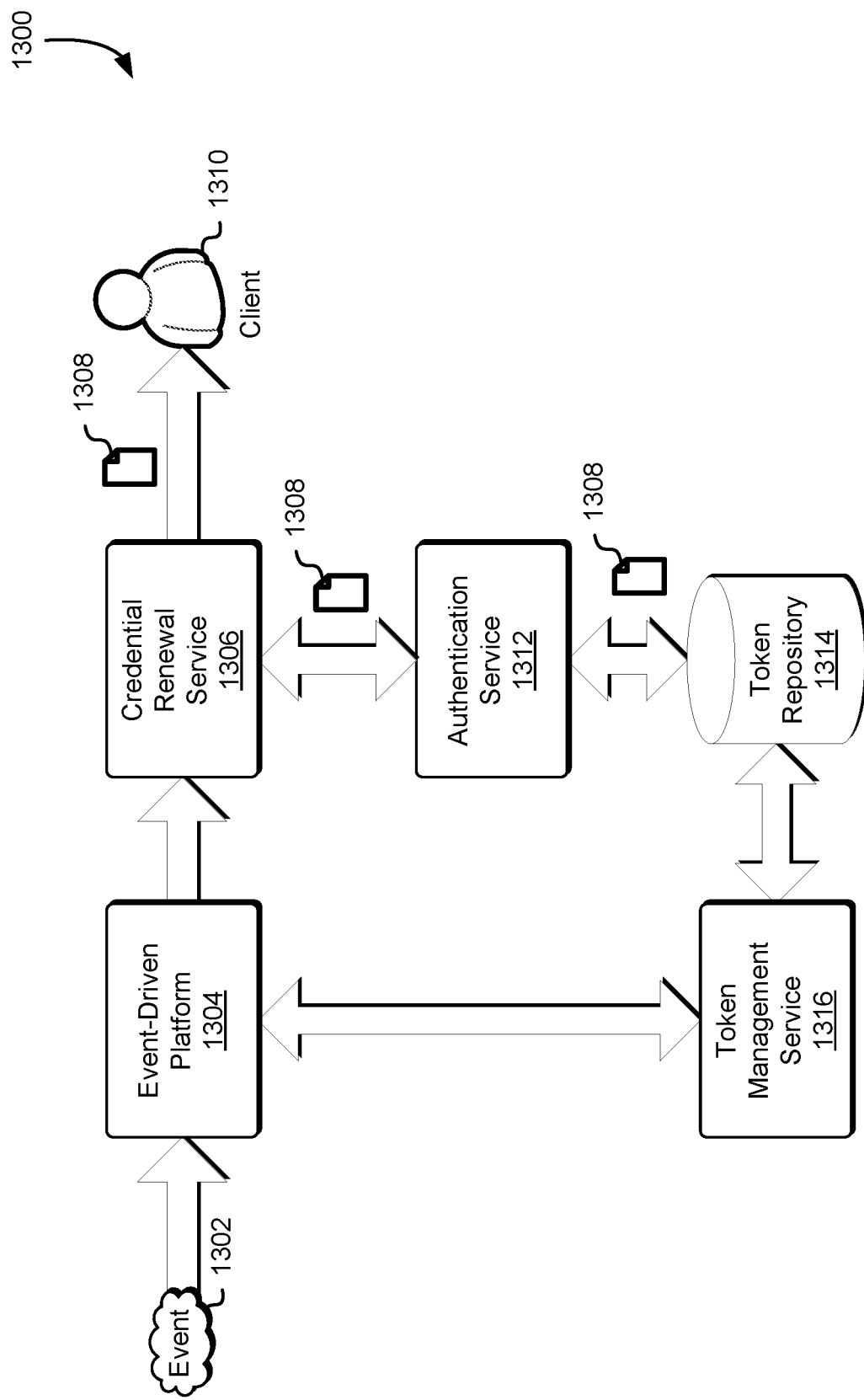
FIG. 13 shows an illustrative example of a credential renewal service publishing credentials to a client.

FIG. 13 illustrates an environment in which various embodiments can be implemented. The computing environment 1300 illustrates an example where a credential renewal service may be utilized to publish credentials to a client. An event 1302 may cause an event-driven platform 1304 to execute custom code that invokes a credential renewal service 1306 which in turn may perform a workflow to obtain credentials 1308 and publish the credentials to a client 1310. Security credentials 1308 may include, for example, a security token. As an example, when a token expires, the credential renewal service may perform a workflow for obtaining a newly generated security token and provide it to the client 1310. In this way, the client does not need to track the state of the security token it uses, determine when the token expires, and obtain a new token.

An event 1302 may refer to a condition that serves as a precondition to the invocation of custom code. Examples of events 1302 discussed above in connection with FIGS. 7-9 may also apply to FIG. 13. As an example, the event-driven platform 1304 may detect a timed event 1302 which causes the event-driven platform to trigger the credential renewal service 1306 to obtain, on behalf of the client 1310, a new security credential that may be generated in response to the expiration of a previous security token. In some embodiments, the credential renewal service 1306 provides the credentials 1308 to the client 1310 via a cryptographically protected communication session such as a TLS session.

The client 1310 may be configured such that when it receives the updated credentials 1308 it replaces an expired security token or, more generally, a previously received token (which may have been invalidated due to a key rotation) with a security token included in the updated credentials 1308. The client or a software development kit (SDK) installed on the client, may be configured to obtain a resource name identifier (i.e., cause a computer system executing the SDK to obtain a resource name) from the received token and replace a previously received token having the same resource name identifier (i.e., replacing an old token with the newly received token). In some embodiments, the security token is or has an HMAC that includes a resource name identifier that the client 1310 may use to identify the role associated with the security token.

The event-driven platform 1304 may be the same as or similar to those described in other embodiments, but may also be configured to communicate with a credential renewal service. The credential, renewal service may be invoked by the event-driven platform based on an event or event type. For example, when a security token expires, the event-driven platform may be configured to notify the credential renewal service that a token has expired and/or that a new token has been generated (e.g., one that is presently valid having an expiration time in the future). In some embodiments, the event-driven platform 1304 may access a token management service 1316 such as those described in other embodiments, such as in the case where the token management service is used to generate a new token to replace an expired token.

The credential renewal service 1306 may be implemented using software, hardware, or some combination thereof. The credential renewal service may be a service that enables clients to subscribe to and receive notifications regarding changes to credentials such as security tokens. When a client logs into a system (e.g., in accordance with FIGS. 2, 7, 8, and 9), the credential renewal service may store the session information and automatically subscribe the client to receive credential updates.

In an embodiment, when a client (such as the client 1310 shown in FIG. 13) logs into a system, its identity is authenticated by an authentication service and the client may receive a security token that expires after a predetermined period. The authentication service may provide a credential renewal service with information about the client that allows the credential renewal service to publish updates to the security token. Thus, when the security token expires, the client receives, from the credential renewal service, an updated security token. The client may replace the expired token with the updated token and continue to perform operations such as assumption of roles with the updated token.

Consider a second embodiment, where multiple clients have logged into a system and assumed a destination role. If it has been determined that an abnormal event has occurred (e.g., a login from an unexpected geolocation), the system may determine that a key rotation should occur, invalidating all outstanding instances of the security token associated to the role. The credential renewal service may, after a key rotation, publish the updated security token generated using the new key to one or more clients. Furthermore, the credential renewal service may exclude one or more clients in this case based on the abnormal event. For example, a particular user or a set of device sessions using the user account may be excluded from receiving the new security token when the credential renewal service publishes it to the group.

In some embodiments, the credential renewal service 1306 obtains security credentials 1308 from an authentication service 1312 on behalf of a client 1310. In obtaining the security credentials 1308, the credential renewal service may impersonate the client 1310 as to ensure that the credential renewal service 1306 does not provide a client 1310 a security token that the client 1310 could not have obtained directly (e.g., via a client request). In some examples, the credential renewal service may assume an intermediary role, and then assume the destination role corresponding to the role of the security token that has expired using the client's identity information. In this manner, the credential renewal service 1306 performs the same two-step assumption process that the client 1310 would have needed to perform in order to obtain the security token. The authentication service 1312 may access a token repository 1314 and/or token management service 1316 as part of various operations described above. In some embodiments, the security token is or includes an HMAC having an expiration time.

The credential renewal service 1306 may also be used to generate a new security token prior to the expiration of an existing security token. As an example, consider the case where an existing security token expires every 30 minutes. The credential renewal service may be configured to determine when the existing token is set to expire and at a predetermined time before expiration of the existing token, generate a new token and distribute the new security token for use by a client 1310. The client may receive 1310 the new security token, determine the resource name identifier (e.g., role) associated with the security token, and replace an existing security tokens it has with the resource name identifier. As an example, the following steps may occur:

| Time | Event |
|------|-------|
| 0:00 | Client receives a first security token that expires after 15 minutes (at 0:15). |
| 0:10 | Credential renewal service determines that the first security token will expire in 5 minutes and generates a second security token that expires after 15 minutes (at 0:30). |

| Time | Event |
|------|-------|
| 0:10 | Client receives the second security token and replaces the first security token with the second security token. |

In some cases, the security token may include non-overlapping expiration intervals such that the client 1310 may receive a new security token, store the new security token, and discard the existing security token when the existing security token expires and/or the new security token becomes valid. As a second example, the following steps may occur:

| Time | Event |
|------|-------|
| 0:00 | Client receives a first security token that is valid from 0:00:00-0:14:59. |
| 0:10 | Credential renewal service determines that the first security token will expire in 5 minutes and generates a second security token that is valid from 0:15:00-0:29:59. |
| 0:10 | Client receives and stores the second security token. |
| 0:15 | Client replaces the first security token with the second security token. |

Figure 14:
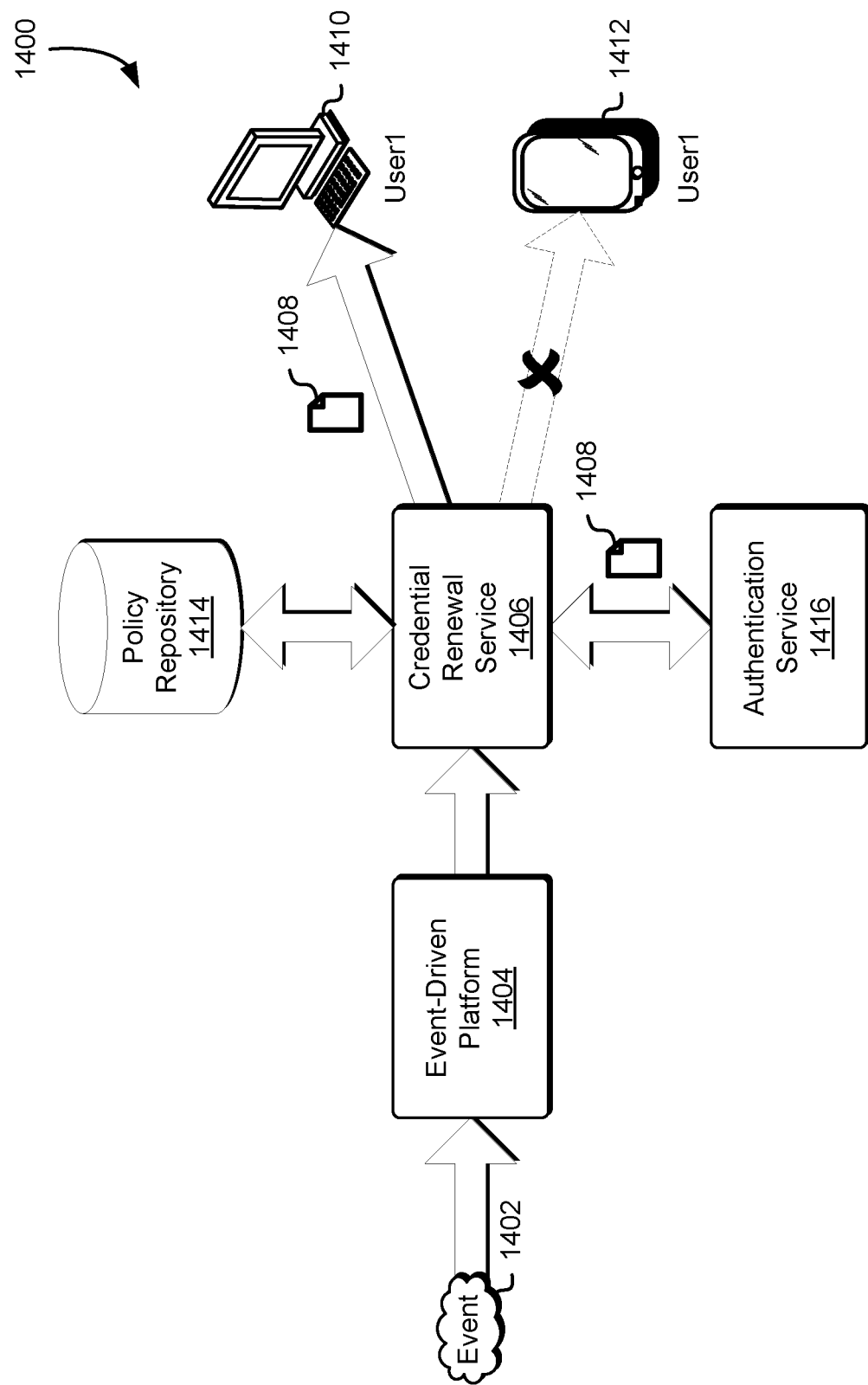
FIG. 14 shows an illustrative example of a credential renewal service selectively publishing security token updates to one device of a user account but not another device of the same user account.

FIG. 14 illustrates an environment in which various embodiments can be implemented. The computing environment 1400 illustrates an example where a credential renewal service may be used to selectively publish security tokens. As in other embodiments, an event 1402 may cause an event-driven platform 1404 to execute custom code that invokes a credential renewal service 1406. The credential renewal service 1406 may perform additional steps to determine whether to publish a security token. As an example, FIG. 14 may show an environment similar to the situation described in connection with FIG. 9 where a first device of a user 1410 and a second device of a user 1412 may be treated differently based on an abnormal event. In the case of an abnormal event (e.g., abnormal login), a policy repository 1414 may record a deny policy for a device associated with the abnormal event. The credential renewal service 1406 may be configured to detect that a particular device has an associated deny policy and omit publishing the credentials 1408 to that device. Conversely, for another device of the user 1410 that is not associated with a deny policy, the credentials 1408 may be obtained from an authentication service 1416 and published in accordance with embodiments described above in connection with FIG. 13.

In some embodiments, selective publication may be performed based on other criteria, including properties of the security token. Consider examples where a user device (such as device 1410) has multiple security tokens that may be used to access various resources. In some cases, the credential renewal service 1406 may be configured to automatically publish updated tokens. However, in some cases, such as where a security token is associated with sensitive data, the tokens may not be automatically published and the client may instead obtain the token using the workflows described above, for example, in connection with FIGS. 1 and 7.

Figure 15:
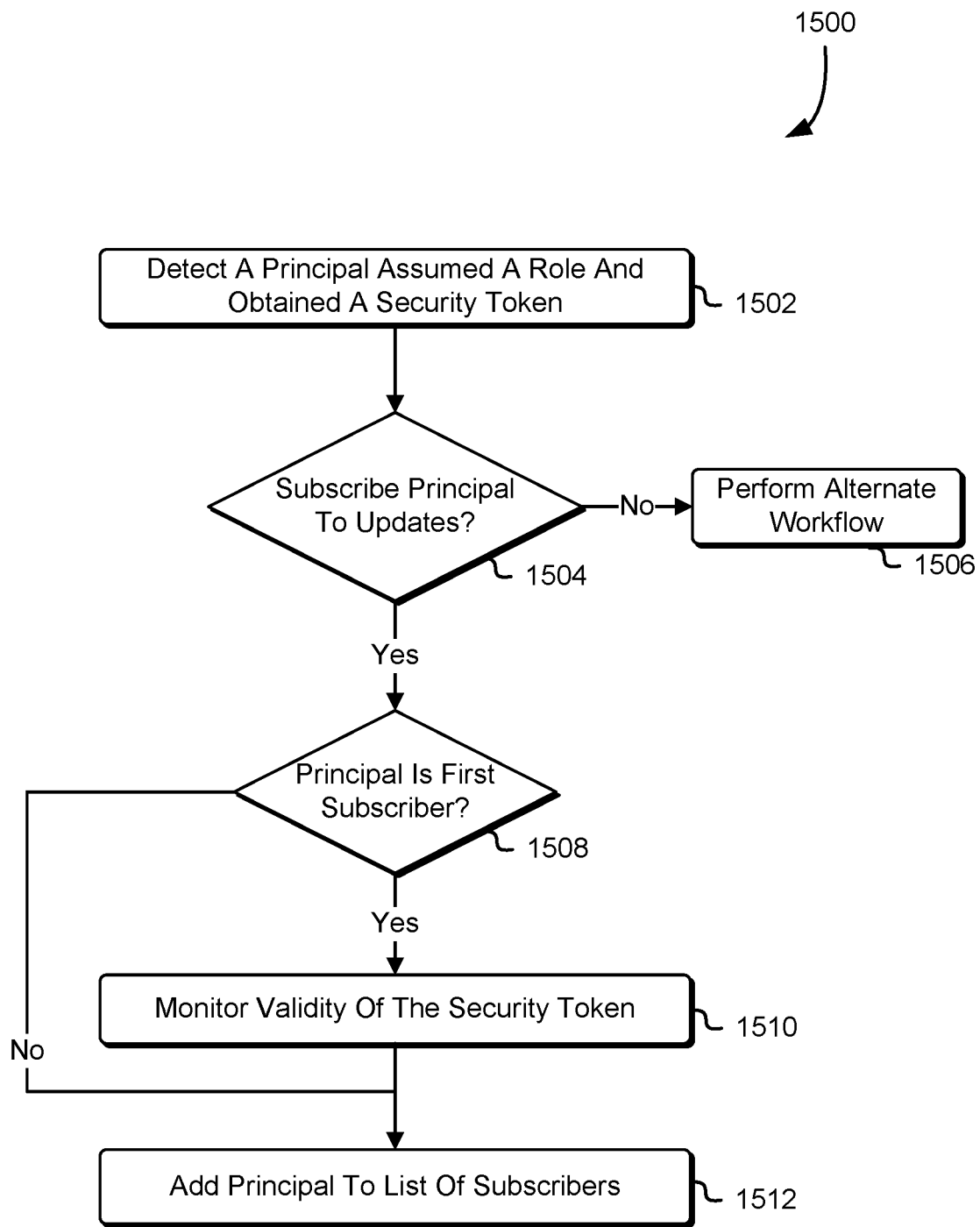
FIG. 15 shows a diagram illustrating a process for subscribing for security token notifications.

FIG. 15 shows an illustrative example of a process 1500 for subscribing principals to receive notifications of security tokens. Generally, the process 1500 may be performed by various systems described herein such as an event-driven platform described above in connection with FIGS. 7-14. In some embodiments, when a principal assumes a destination role (such as in the manner described above in connection with FIGS. 1 and 2), the authorization service receive the request and detect 1502 that the principal successfully assumes the role and obtains a security token for that role. The authorization service may determine whether 1504 to subscribe the principal to automatically receive updates to the security token. If the principal should be subscribed to receive updates, the system may then further determine whether 1508 the principal is the first subscriber with respect to the role. If the principal is the first subscriber, it may use an event-driven platform to monitor 1510 validity of the security token and provide instructions for the event-driven platform to execute custom code to notify one or more subscribers when the role's security token becomes invalid (e.g., as a result of expiration) or invalidated (e.g., because of a key rotation). Information regarding how to communicate with the principal may be added 1512 to a list of principals that are subscribed to updates as to the validity of the security token for the role. In some embodiments, each principal may separately monitor the validity of the security token.

If the system determines that the principal should not be subscribed to updates, an alternative workflow may be performed 1506, which may in some cases be to perform no work. There are various conditions that may result in the system determining not subscribe the principal to updates—in some embodiments, mobile computing devices, such as smartphones and laptops, may not be subscribed to automatically receive notifications of updated security tokens. As a second example, devices with certain operating systems or operating system versions may not be subscribed.

Figure 16:
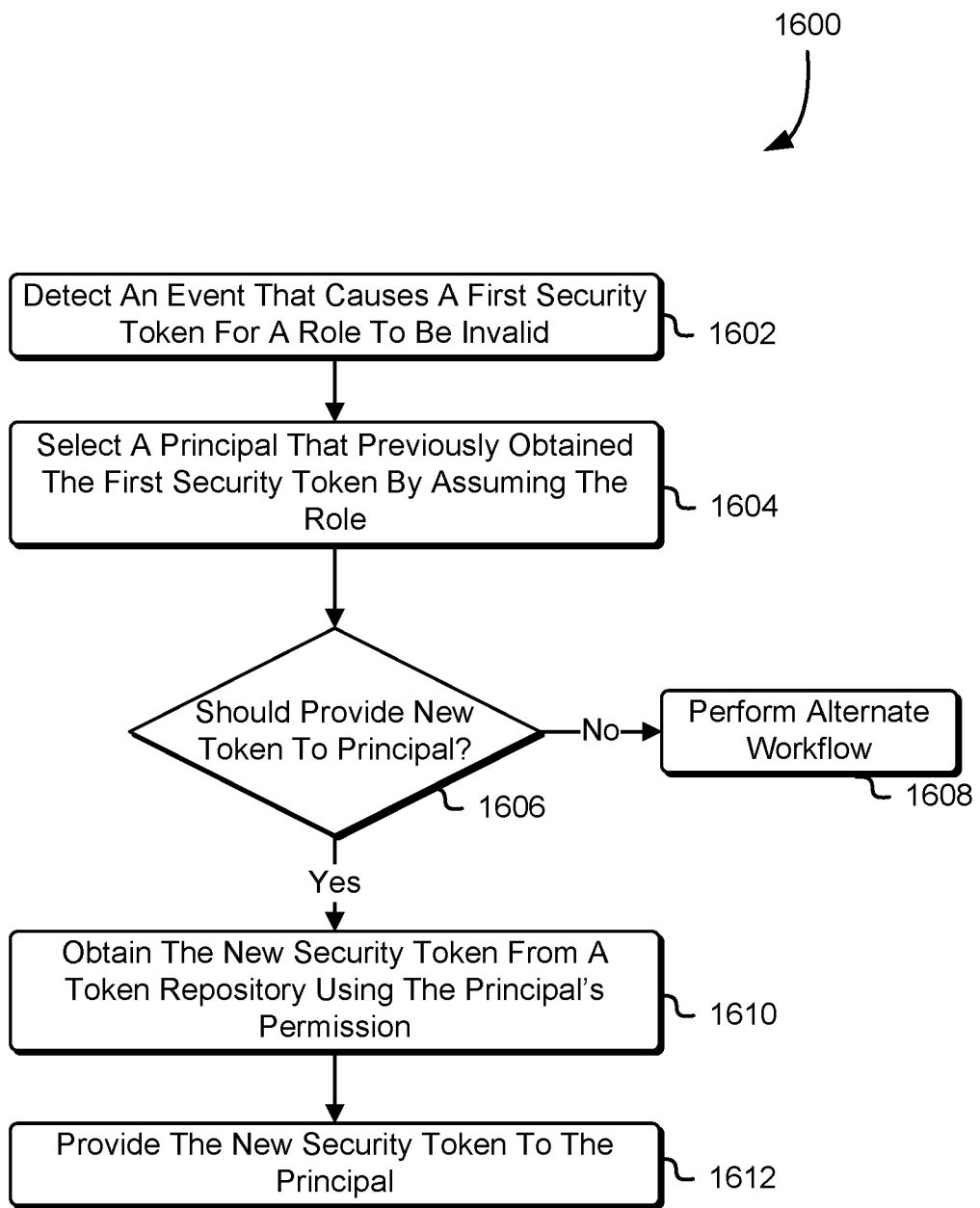
FIG. 16 shows a diagram illustrating a process for publishing security token notifications.

FIG. 16 shows an illustrative example of a process 1600 for publishing security tokens to clients. Generally, the process 1600 may be performed by various systems described herein such as an event-driven platform described above in connection with FIGS. 7-14. A system such as the event-driven platform may detect 1602 an event that causes the security token for a role to become invalid (e.g., as a result of expiration) or invalidated (e.g., because of a key rotation). The system may select 1604 a principal that previously obtained the security token (e.g., when assuming the role). The selection may be made by accessing a list of subscribers such as the list described above in connection with FIG. 15. The system may determine whether 1606 to provide a new security token for the role to the principal. The new security token may be generated in response to the system determining the security token to be invalid. The system may obtain 1610 from a token repository the new security token using the principal's permissions. The obtaining may be done as a request that impersonates the principal, assumes the role of the principals, or uses one or more permissions that the principal may have used in a request by the principal. The system may successfully retrieve the new security token using the principal's permissions, indicating that the principal is both authorized to access the resource and the request is authenticated. The system may then provide 1612 the new security token to the principal, such as by providing it to the principal, such as via a Message Queuing Telemetry Transport (MQTT) channel in accordance with ISO/IEC PRF 20922 specification which is hereby incorporated by reference herein. The new security token may be made available or provided implicitly (e.g., a reference is provided such that the reference may be used to obtain the new security token from another source, such as a URL address or Uniform Resource Identifier).

If the system determines that the principal should not provide a new security token to the principal, an alternative workflow may be performed 1608, which may in some cases may be to perform no work. There are various conditions that may result in the system determining not subscribe the principal to updates—in some embodiments, mobile computing devices, such as smartphones and laptops, may not automatically receive notifications of updated security tokens. As a second example, devices with certain operating systems or operating system versions may not automatically receive notifications of updated security tokens.

In some embodiments, the HMAC includes an expiration interval or an expiration time. For example, an expiration interval may be expressed as "07/16/2016 14:00:00-15:00:00 UTC" to indicate that the token is valid from 2 PM-3 PM on Jul. 16, 2016 and an expiration time may be expressed as "07/16/2016 17:00:00 UTC" to indicate that the token is valid until 5 PM on Jul. 16, 2016. In some embodiments, the time interval may be described in accordance with prevailing time or calendaring standards such as the ISO 8601 format.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., keyed-hash based message authentication code (HMAC)), key derivation functions, such as PBKDF2 and bcrypt (with the password being based at least in part on the plaintext and the cryptographic key), and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold) and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated by reference herein.

Figure 17:
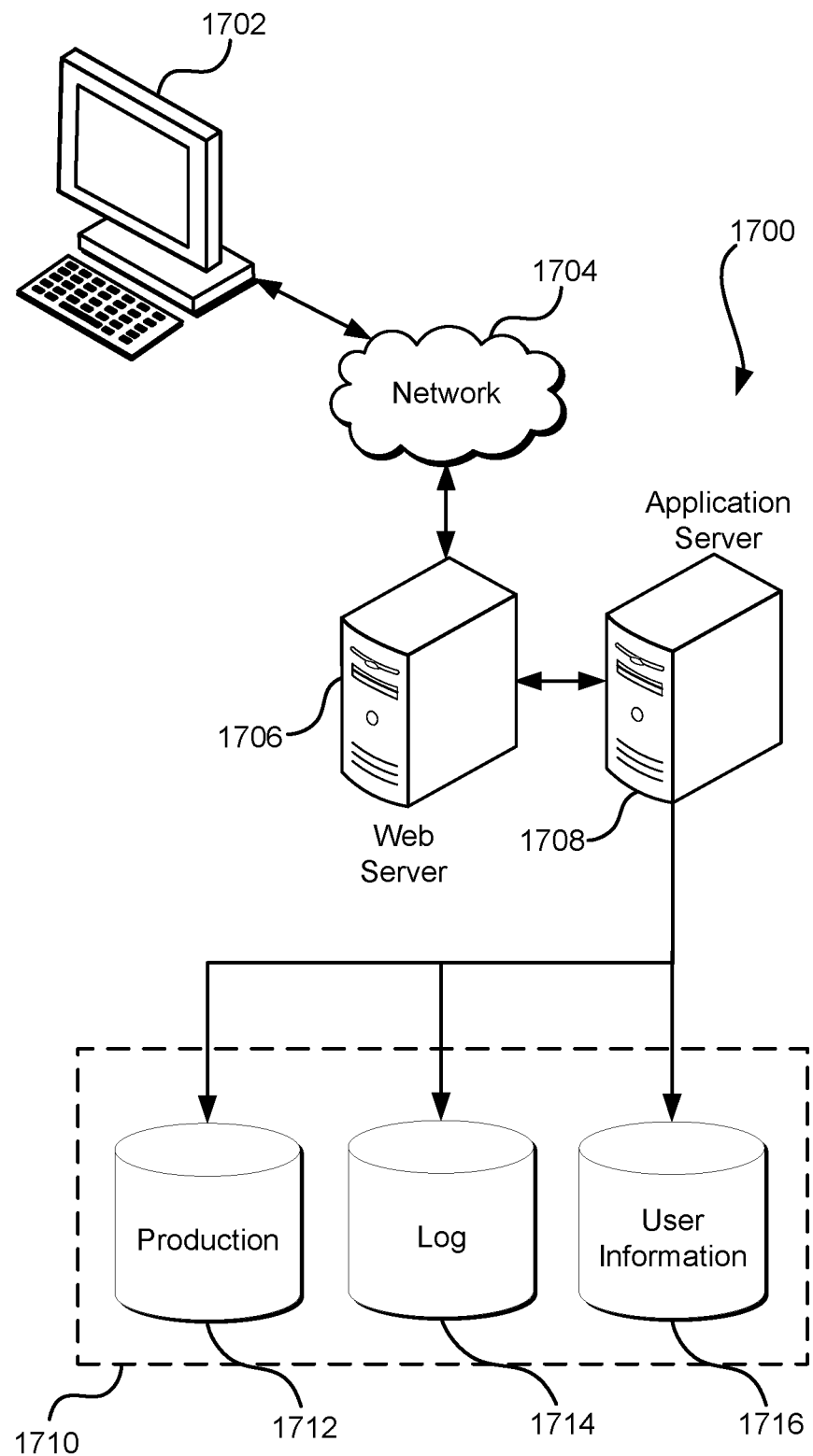
FIG. 17 illustrates an environment in which various embodiments can be implemented.

FIG. 17 illustrates aspects of an example environment 1700 for implementing aspects in accordance with various embodiments. As will be appreciated, although a web-based environment is used for purposes of explanation, different environments may be used, as appropriate, to implement various embodiments. The environment includes an electronic client device 1702, which can include any appropriate device operable to send and/or receive requests, messages, or information over an appropriate network 1704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1706 for receiving requests and serving content in response thereto, although for other networks an alternative device serving a similar purpose could be used as would be apparent to one of ordinary skill in the art.

The illustrative environment includes at least one application server 1708 and a data store 1710. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1702 and the application server 1708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1710 can include several separate data tables, databases, data documents, dynamic data storage schemes, and/or other data storage mechanisms and media for storing data relating to a particular aspect of the present disclosure. For example, the data store illustrated may include mechanisms for storing production data 1712 and user information 1716, which can be used to serve content for the production side. The data store also is shown to include a mechanism for storing log data 1714, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1710. The data store 1710 is operable, through logic associated therewith, to receive instructions from the application server 1708 and obtain, update, or otherwise process data in response thereto. The application server 1708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the system 1700 in FIG. 17 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
   obtaining, from a requestor, a first request to assume a first role, the first role comprising a first set of permissions, wherein a second set of permissions is used by the requestor and further wherein the second set of permissions is sufficient to assume the first role and insufficient to assume a second role;
   determining that assumption of the first role by the requestor is authorized, wherein the assumption of the first role results in the requestor relinquishing the second set of permissions;

providing, to the requestor, a first token in response to the first request, the first token comprising a first expiration and a first indication of authorization to assume the first role;

contingent upon the requestor assuming the first role, obtaining, from the requestor, a second request to assume the second role, the second request comprising the first token;

determining, based at least in part on the first indication, that assumption of the second role by the requestor is authorized;

contingent upon the second request being made by the requestor under assumption of the first role, providing, to the requestor, a second token in response to the second request, the second token comprising a second expiration and a second indication of authorization to access one or more computing resources by assuming the second role, wherein the first token lacks indication of authorization to access the one or more computing resources by assuming the first role; and in response to using a cryptographic key to verify that a keyed-hash message authentication code of the second token indicates assumption of the second role is authorized, providing authorization to access to a computing resource of the one or more computing resources.

2. The computer-implemented method of claim 1, wherein determining that assumption of the second role by the requestor is authorized includes obtaining the first token from the second request and verifying that the first token indicates an assumption of the first role.

3. The computer-implemented method of claim 1, wherein the first indication of authorization to assume the first role includes a first keyed-hash message authentication code generated over a message that includes at least a resource name identifier associated with the first role and the first expiration.

4. The computer-implemented method of claim 1, comprising:
obtaining, from a second requestor, a third request to assume the second role, the third request comprising a third token;
determining that assumption of the second role by the requestor is authorized; and
providing, to the second requestor, the second token.

5. A system, comprising:
one or more processors and memory that stores computer-executable instructions that, when executed, cause the one or more processors to:
obtain, from a requestor, a first request to assume a first role, the first role comprising a first set of permissions, wherein a second set of permissions is used by the requestor and further wherein the second set of permissions is sufficient to assume the first role and insufficient to assume a second role;
determine that assumption of the first role by the requestor is authorized, wherein the assumption of the first role results in the requestor relinquishing the second set of permissions;
provide, to the requestor, a first token in response to the first request, the first token comprising a first expiration and a first indication of authorization to assume the first role;
contingent upon the requestor assuming the first role, obtain, from the requestor, a second request to assume the second role, the second request comprising the first token;
determine, based at least in part on the first indication, that assumption of the second role by the requestor is authorized;
contingent upon the second request being made by the requestor under assumption of the first role, provide, to the requestor, a second token in response to the second request, the second token comprising a second expiration and a second indication of authorization to access one or more computing resources by assuming the second role, wherein the first token lacks indication of authorization to access the one or more computing resources by assuming the first role; and
in response to using a cryptographic key to verify that a keyed-hash message authentication code of the second token indicates assumption of the second role is authorized, provide authorization to access to a computing resource of the one or more computing resources.

6. The system of claim 5, wherein:
the first token comprises a resource name identifier corresponding to the first role and a hashed first message; and
the computer-executable instructions to verify the requestor has assumed the first role comprises, when executed, further cause the one or more processors to:
generate a hashed second message using at least the resource name identifier corresponding to the first role; and
verify that the hashed first message and the hashed second message match.

7. The system of claim 6, wherein the hashed second message is generated using at least the resource name identifier corresponding to the first role and the first expiration.

8. The system of claim 5, wherein the computer-executable instructions include instructions that, when executed, further cause the one or more processors to:
obtain, from the requestor, a third request to access the computing resource of the one or more computing resources, the second request including the second token, the second token comprising a hashed first message;
verify the requestor has assumed the second role by generating a hashed second message, the hashed second message enables access to the one or more computing resources and determining that the hashed first message and the hashed second message match;
determine, based on an access control list, that assumption of the second role grants access to the computing resource of the one or more computing resources; and
make the computing resource of the one or more computing resources available to the requestor.

9. The system of claim 5, wherein:
the second request further includes identity information of the requestor; and
the computer-executable instructions include instructions that, when executed, further cause the one or more processors to:
store a list of principals that is authorized to assume the second role; and
verify, based at least in part on comparing the identity information of the requestor with the list, that the requestor is authorized to assume the second role.

10. The system of claim 9, wherein the list of principals is stored in a database table associated to the second role.

11. The system of claim 5, wherein the computer-executable instructions include instructions that, when executed, further cause the one or more processors to:

obtain, from a second requestor, a third request to assume a third role different from the second role, the third request comprising the second token;

verify, based at least in part on the second token, the second requestor has assumed the first role, where assumption of the first role enables assumption of the third role; and provide, to the second requestor, a third token that enables the requestor to access to a second plurality of resources corresponding to resources that are accessible by assuming the third role.

12. The system of claim 5, wherein:

the second token that enables the requestor to access to a plurality of resources that includes assuming a third role; and the computer-executable instructions include instructions that, when executed, further cause the one or more processors to:

obtain, from the requestor, a third request to assume the third role, the third request comprising the second token;

verify, based at least in part on the second token, the requestor has assumed the second role, where assumption of the second role enables assumption of the third role; and provide, to the requestor, a third token that enables the requestor to access to the plurality of resources.

13. A non-transitory computer-readable storage medium comprising executable instructions that, as a result of being executed by one or more processors of a computer system, cause the one or more processors to:

obtain, from a requestor, a first request to assume a first role, the first role comprising a first set of permissions, wherein a second set of permissions is used by the requestor and further wherein the second set of permissions is sufficient to assume the first role and insufficient to assume a second role;

determine that assumption of the first role by the requestor is authorized, wherein the assumption of the first role results in the requestor relinquishing the second set of permissions;

provide, to the requestor, a first token in response to the first request, the first token comprising a first expiration and a first indication of authorization to assume the first role;

contingent upon the requestor assuming the first role, obtain, from the requestor, a second request to assume the second role, the second request comprising the first token;

determine, based at least in part on the first indication, that assumption of the second role by the requestor is authorized;

contingent upon the second request being made by the requestor under assumption of the first role, provide, to the requestor, a second token in response to the second request, the second token comprising a second expiration and a second indication of authorization to access one or more computing resources by assuming the second role, wherein the first token lacks indication of authorization to access the one or more computing resources by assuming the first role; and in response to using a cryptographic key to verify that a keyed-hash message authentication code of the second token indicates assumption of the second role is authorized, provide authorization to access to a computing resource of the one or more computing resources.

14. The non-transitory computer-readable storage medium of claim 13, wherein the instructions further comprise instructions that, as a result of being executed by the one or more processors, cause the computer system to:

obtain, from the requestor, a third request, the third request being to assume the second role and including the second token;

verify, using at least the second token, that the requestor is authorized to assume the first role; and provide a third token to the requestor in response to the third request, the third token enabling access to the one or more computing resources.

15. The non-transitory computer-readable storage medium of claim 14, wherein:

verifying that the requestor is authorized to assume the first role includes determining, based on the second token, that the second token authorizes assumption of the second role using at least by using one-way hash function to verify validity of token data provided.

16. The non-transitory computer-readable storage medium of claim 13 wherein:

assumption of the first role grants access to assume the second role and relinquishes access to computing resources accessible to the requestor; and requests to assume the second role without assuming the first role are denied.

17. The non-transitory computer-readable storage medium of claim 13, wherein the assumption of the first role enables exercise of the first set of permissions for accessing a first plurality of resources.

18. The non-transitory computer-readable storage medium of claim 17, wherein the first plurality of resources is included in the one or more computing resources.

19. The non-transitory computer-readable storage medium of claim 13, wherein the second token further enables assumption of another role, where assumption of the another role enables exercise of a first plurality of permissions associated with the another role for accessing a second plurality of resources.

20. The non-transitory computer-readable storage medium of claim 13, wherein assumption of the first role by the requestor grants a different set of permissions and relinquishes one or more permissions not included in the different set of permissions.

* * * * *